US011657405B2

(12) United States Patent
Chowdhury et al.

(10) Patent No.: US 11,657,405 B2
(45) Date of Patent: May 23, 2023

(54) DETECTION OF RECYCLED INTEGRATED CIRCUITS AND SYSTEM-ON-CHIPS BASED ON DEGRADATION OF POWER SUPPLY REJECTION RATIO

(71) Applicant: University of Florida Research Foundation, Incorporated, Gainesville, FL (US)

(72) Inventors: Sreeja Chowdhury, Gainesville, FL (US); Fatemeh Ganji, Gainesville, FL (US); Nima Maghari, Gainesville, FL (US); Domenic J. Forte, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 330 days.

(21) Appl. No.: 17/008,722

(22) Filed: Sep. 1, 2020

(65) Prior Publication Data

US 2021/0081574 A1 Mar. 18, 2021

Related U.S. Application Data

(60) Provisional application No. 62/901,676, filed on Sep. 17, 2019.

(51) Int. Cl.
*G06Q 30/018* (2023.01)
*G06F 21/73* (2013.01)
(Continued)

(52) U.S. Cl.
CPC ......... *G06Q 30/0185* (2013.01); *G06F 21/44* (2013.01); *G06F 21/73* (2013.01);
(Continued)

(58) Field of Classification Search
CPC .. G06Q 30/0185; G06Q 30/018; G06F 21/44; G06F 21/73; G06N 20/00; G06N 7/005
See application file for complete search history.

(56) References Cited

U.S. PATENT DOCUMENTS 9,454,168 B2 *  9/2016  Patel ..................... G05F 1/59
2017/0126229 A1 *  5/2017  Tan .................. G11C 29/12015
(Continued)

FOREIGN PATENT DOCUMENTS

CN         106546908 A  *  3/2017  ......... G01R 31/2851

OTHER PUBLICATIONS

Halit Dogan et al. "Aging analysis for recycled FPGA detection", 2014 IEEE International Symposium on Defect and Fault Tolerance in VLSI and Nanotechnology Systems (DFT) (pp. 171-176) (Year: 1020).*

(Continued)

*Primary Examiner* — Alvaro E Fortich
*Assistant Examiner* — Dilara Sultana
(74) *Attorney, Agent, or Firm* — Alston & Bird LLP

(57) ABSTRACT

Embodiments of the present disclosure provide methods, systems, apparatus, and computer program products are for detecting whether a suspect component such as an integrated circuit (IC) or a system-on-chip (SoC) is recycled. Specifically, various embodiments involve processing power supply rejection ratio (PSRR) data obtained from a low drop-out regulator (LDO) used for the suspect component using a recycle detection machine learning model to generate a recycle prediction. In particular embodiments, the recycle detection machine learning model is developed based at least in part on degradation of PSRRs of LDOs. Accordingly, a determination is made as to whether the suspect (Continued)

component is recycled based on the recycle prediction. If so, then an indication that the suspect component is recycled is provided.

18 Claims, 25 Drawing Sheets

(51) Int. Cl.
*G06N 20/00* (2019.01)
*G06F 21/44* (2013.01)
*G01R 31/28* (2006.01)

(52) U.S. Cl.
CPC ........... *G06N 20/00* (2019.01); *G06Q 30/018* (2013.01); *G01R 31/2851* (2013.01)

(56) References Cited

U.S. PATENT DOCUMENTS

2018/0068042 A1* 3/2018 Atwell .................... G06F 30/36
2018/0120879 A1* 5/2018 Du .......................... G05F 1/575

OTHER PUBLICATIONS

Chowdhury, Sreeja et al. *Recycled Analog and Mixed Signal Chip Detection at Zero Cost Using LDO Degradation*, In 2019 IEEE International Test Conference (ITC), (2019), pp. 1-11.
Chowdhury, Sreeja et al. *Recycled SoC Detection Using LDO Degradation*, SN Computer Science, (2020), vol. 1, No. 312, pp. 1-21.

* cited by examiner

V1:1hr aging

V1:4hr aging

V2:1hr aging

V2:4hr aging

V3:1hr aging

V3:4hr aging

V4:1hr aging

V4:4hr aging

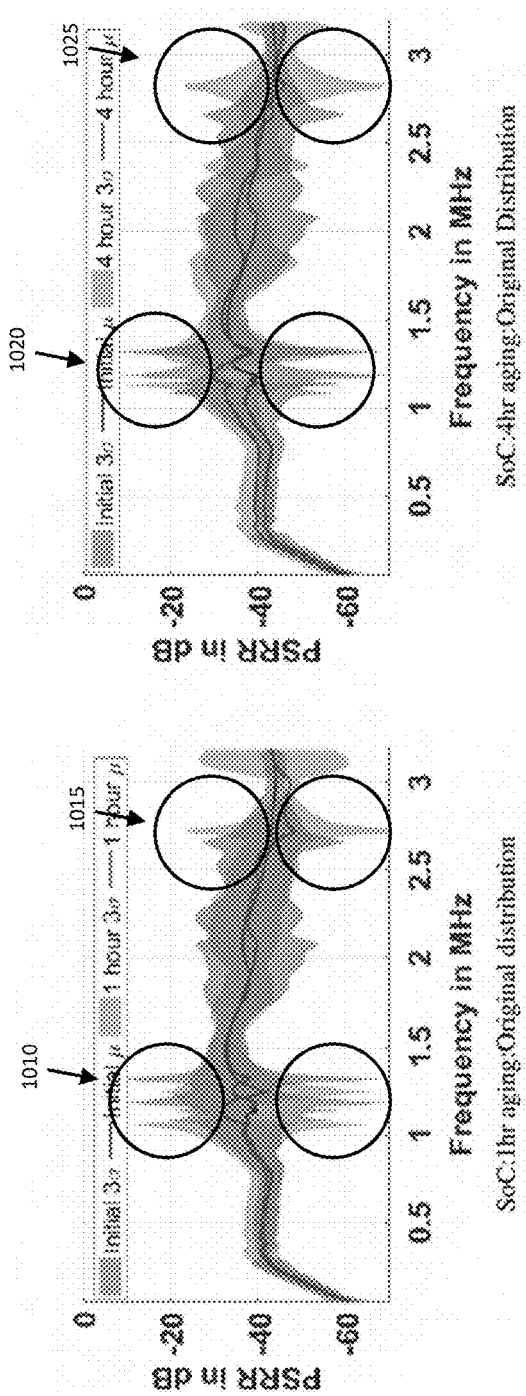
FIG. 10A
FIG. 10B
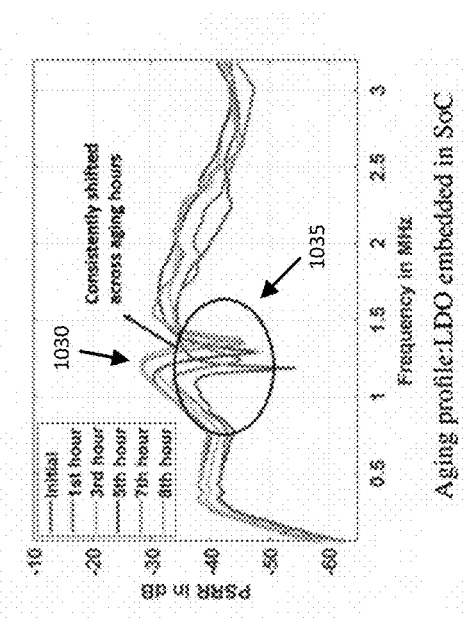
FIG. 10C

DETECTION OF RECYCLED INTEGRATED CIRCUITS AND SYSTEM-ON-CHIPS BASED ON DEGRADATION OF POWER SUPPLY REJECTION RATIO

CROSS-REFERENCE TO RELATED APPLICATIONS

This application claims the benefit of U.S. Provisional Patent Application Ser. No. 62/901,676, filed Sep. 17, 2019, which is incorporated herein by reference in its entirety, including any figures, tables, and drawings.

STATEMENT REGARDING GOVERNMENT SPONSORED RESEARCH OR DEVELOPMENT

This invention was made with government support under 1610075 awarded by the National Science Foundation. The government has certain rights in the invention.

TECHNICAL FIELD

The present application relates to the technical field of detecting counterfeit electronics such as integrated circuit chips (ICs) and system-on-chips (SoCs), and in particular to detecting recycled electronics such as ICs and SoCs using degradation of power supply rejection ratio (PSRR) in low drop out regulators (LDOs).

BACKGROUND

The number of counterfeit parts appearing in the electronics supply chain is increasing every day, and poses serious threats to the economy, security, and safety. A counterfeit electronic component is defined as an electronic part that is (1) an unauthorized copy, (2) does not conform to original component manufacturer's design, model, and/or performance, (3) is not produced by the original component manufacturer or is produced by unauthorized contractors, (4) is an off-specification, defective, and/or used original component manufacturer's product sold as "new" or working, or (5) has incorrect or false markings and/or documentation. While there are many categories of counterfeit electronic components, the recycled type is reportedly the most common. Recycled counterfeits are used components that are often harvested from discarded printed circuit boards (PCBs) and then sold as new on the market. Such components are prone to failure and should not be used in critical applications.

Several processes have been described in the literature to detect and prevent counterfeit electronics. These processes can be broadly divided into three major categories. The first category involves hardware security primitives. This is mostly applicable to new chip designs, where additional security primitives are designed along with existing chip architecture to detect cloned or recycled counterfeits. For cloned counterfeit detection, silicon fingerprints called physical unclonable functions (PUFs) are developed. For recycled detection, odometer or aging sensors called combatting die and IC recycling (CDIR) components are designed. The second category involves targeted electrical testing. This is applicable to detect counterfeit legacy and current electronics. In this case, the addition of new circuits is not an option. Thus, these detection methods focus on general electrical tests. These targeted electrical tests evaluate the performance of the electronics and compare the performance with respect to specification sheets or golden data/samples (e.g., known authentic chips). Most of these approaches used to detect recycled ICs, SoCs, field-programmable gate arrays (FPGAs), and/or the like require data from golden samples, which is often unavailable and serves a drawback. Another essential drawback is that most of these procedures are not automated and applicable to all types of electronics. The third category involves physical inspection. These procedures can detect new, active as well as legacy electronics, but require expensive imaging facilities or expert technical guidance to detect discrepancies between the suspect and golden samples. In addition, the availability of golden samples is mandatory for most of these procedures. Advanced methods include high-tech imaging procedures involving X-ray tomography, scanning electron microscopy, etc. which are used to detect counterfeits. Due to the wide variety of counterfeit components and their respective parameters, it is difficult to formulate a universal testing technique for detecting recycled counterfeit electronics.

Therefore, a need exists in the industry to develop an inexpensive technique to detect recycled counterfeit electronics such as ICs and SoCs across different vendors. It is with respect to these considerations and others that the disclosure herein is presented.

BRIEF SUMMARY

In general, embodiments of the present disclosure provide methods, apparatus, systems, computing devices, computing entities, computer program products and/or the like for detecting whether a suspect component such as an integrated circuit (IC) or a system-on-chip (SoC) is recycled. In accordance with one aspect of the present disclosure, a method is provided for detecting whether a suspect component comprising at least one of an integrated circuit (IC) and a system-on-chip (SoC) is recycled. In particular embodiments, the method includes processing power supply rejection ratio (PSRR) data obtained from a low drop-out regulator (LDO) used for the suspect component using a recycle detection machine learning model to generate a recycle prediction, wherein the recycle detection machine learning model is developed based at least in part on degradation of PSRRs of LDOs, determining whether the suspect component is recycled based on the recycle prediction, and providing an indication that the suspect component is recycled in response to determining the component is recycled.

In accordance with another aspect of the present disclosure, an apparatus is provided for detecting whether a suspect component comprising at least one of an integrated circuit (IC) and a system-on-chip (SoC) is recycled. In particular embodiments, the apparatus includes at least one processor and at least one memory including program code. The at least one memory and the program code are configured to, with the processor, cause the apparatus to at least process power supply rejection ratio (PSRR) data obtained from a low drop-out regulator (LDO) used for the suspect component using a recycle detection machine learning model to generate a recycle prediction, wherein the recycle detection machine learning model is developed based at least in part on degradation of PSRRs of LDOs, determine whether the suspect component is recycled based on the recycle prediction, and provide an indication that the suspect component is recycled in response to determining the component is recycled.

In accordance with another aspect of the present disclosure, a computer program product is provided for detecting whether a suspect component comprising at least one of an integrated circuit (IC) and a system-on-chip (SoC) is recycled. In particular embodiments, the computer program product includes at least one non-transitory computer-readable storage medium having computer-readable program code portions stored therein. The computer-readable program code portions configured to process power supply rejection ratio (PSRR) data obtained from a low drop-out regulator (LDO) used for the suspect component using a recycle detection machine learning model to generate a recycle prediction, wherein the recycle detection machine learning model is developed based at least in part on degradation of PSRRs of LDOs, determine whether the suspect component is recycled based on the recycle prediction, and provide an indication that the suspect component is recycled in response to determining the component is recycled.

In some embodiments, the recycle detection machine learning model is developed using training and testing PSRR data collected from at least one of a plurality of standalone LDOs and a plurality of LDOs embedded in SoCs. Here, some of the standalone LDOs and/or the LDOs embedded in SoCs may be artificially aged. In some embodiments, the training and testing PSRR data includes training PSRR data collected from at least one labeled LDO used by a first component of a first vendor that is used to train the recycle detection machine learning model and testing PSRR data collected from at least one a labeled LDO used by a second component of the first vendor that is used to test the recycle detection machine learning model. In some embodiments, the training and testing PSRR data includes PSRR data collected from one or more labeled LDOs used by one or more components of a same category as the suspect component. In some embodiments, the training and testing PSRR data includes training PSRR data collected from at least one labeled LDO used by a first component of a first vendor that is used to train the recycle detection machine learning model and testing PSRR data collected from at least one labeled LDO used by a second component of a second vendor that is used to test the recycle detection machine learning model. In some embodiments, the training and testing PSRR data includes one or more labeled LDOs used by one or more components of a different category as the suspect component. Finally, in some embodiments, the training and testing PSRR data comprises PSRR data collected from a non-labeled LDO used by a component.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 9:
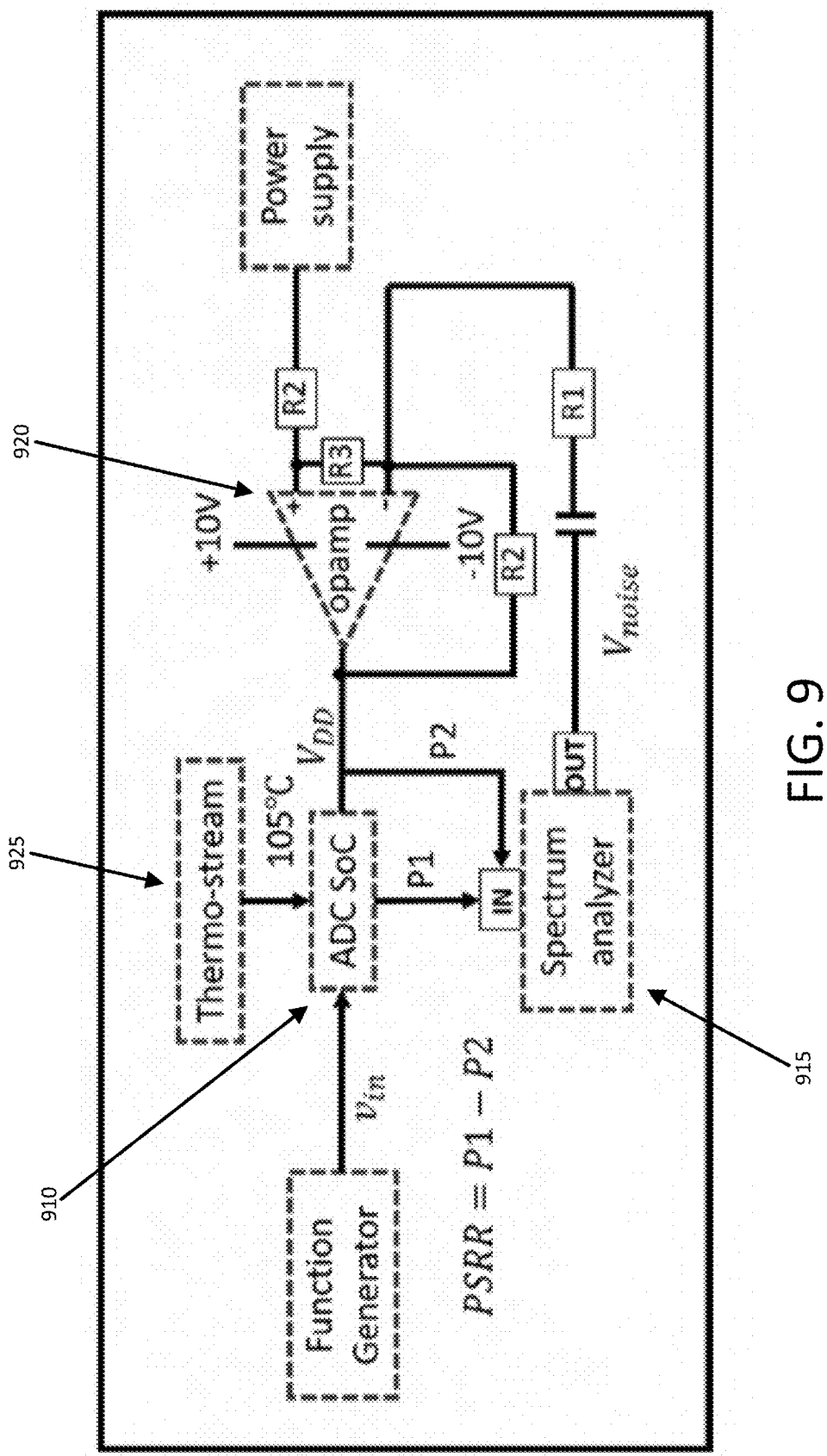
Figures 11A, 11B:
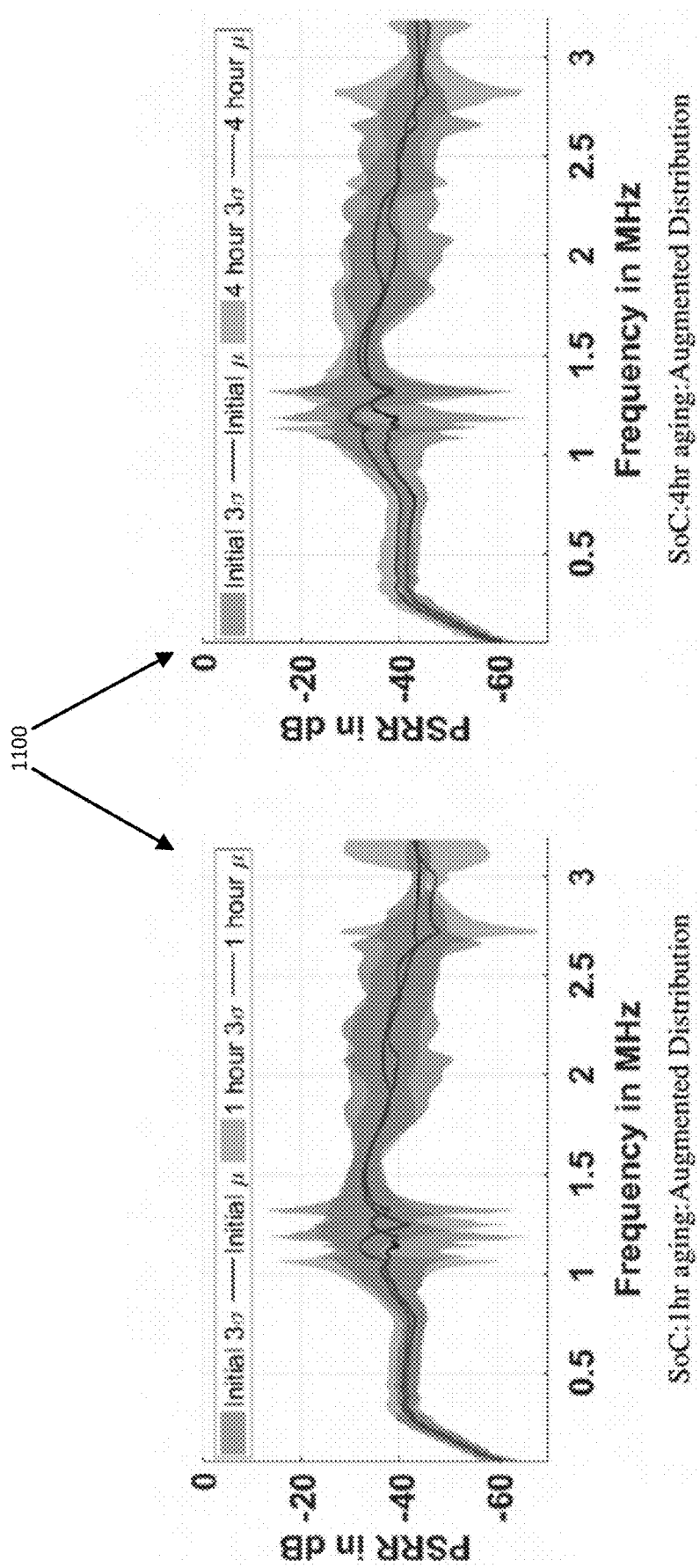
Figure 12:
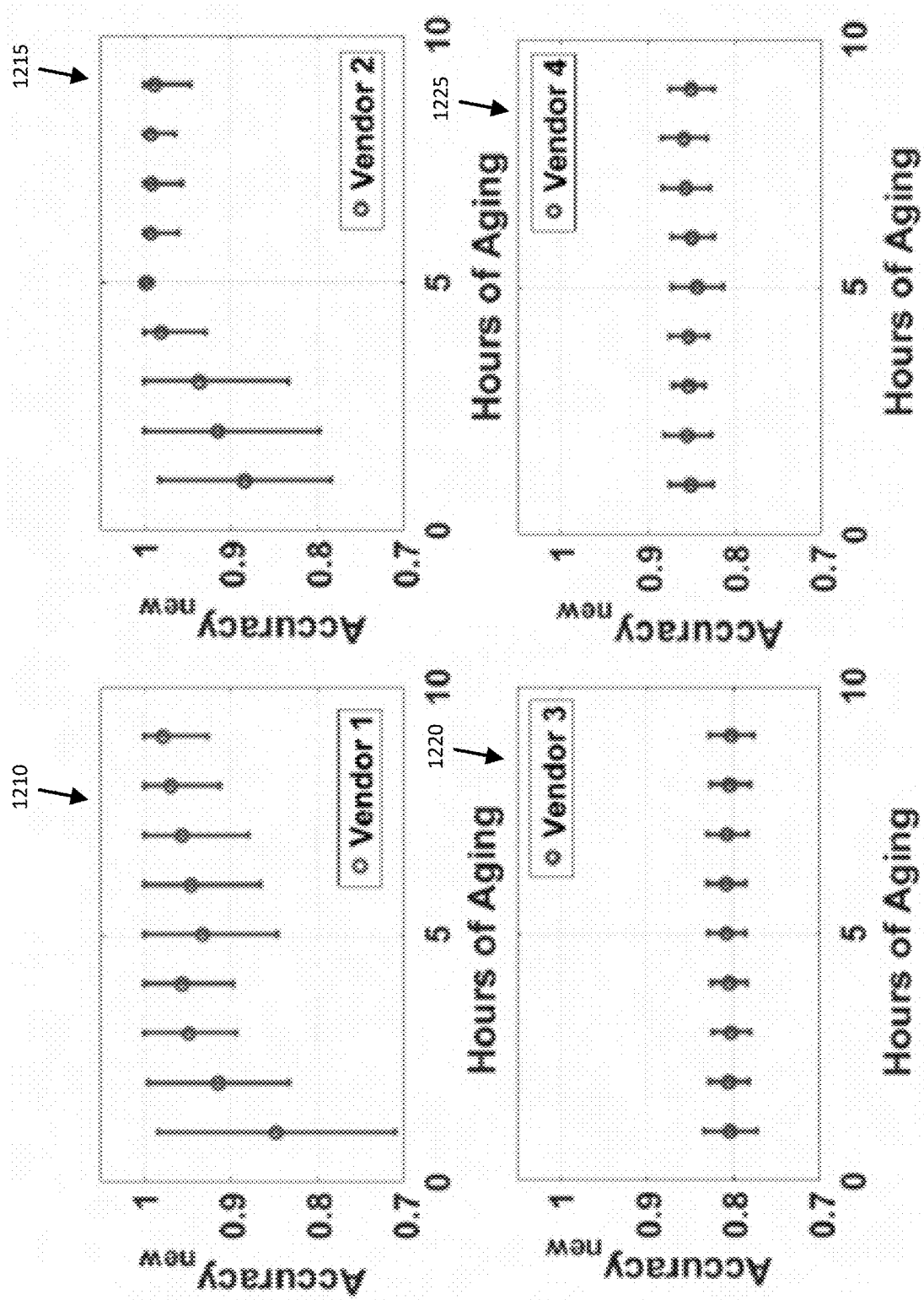
Figure 13:
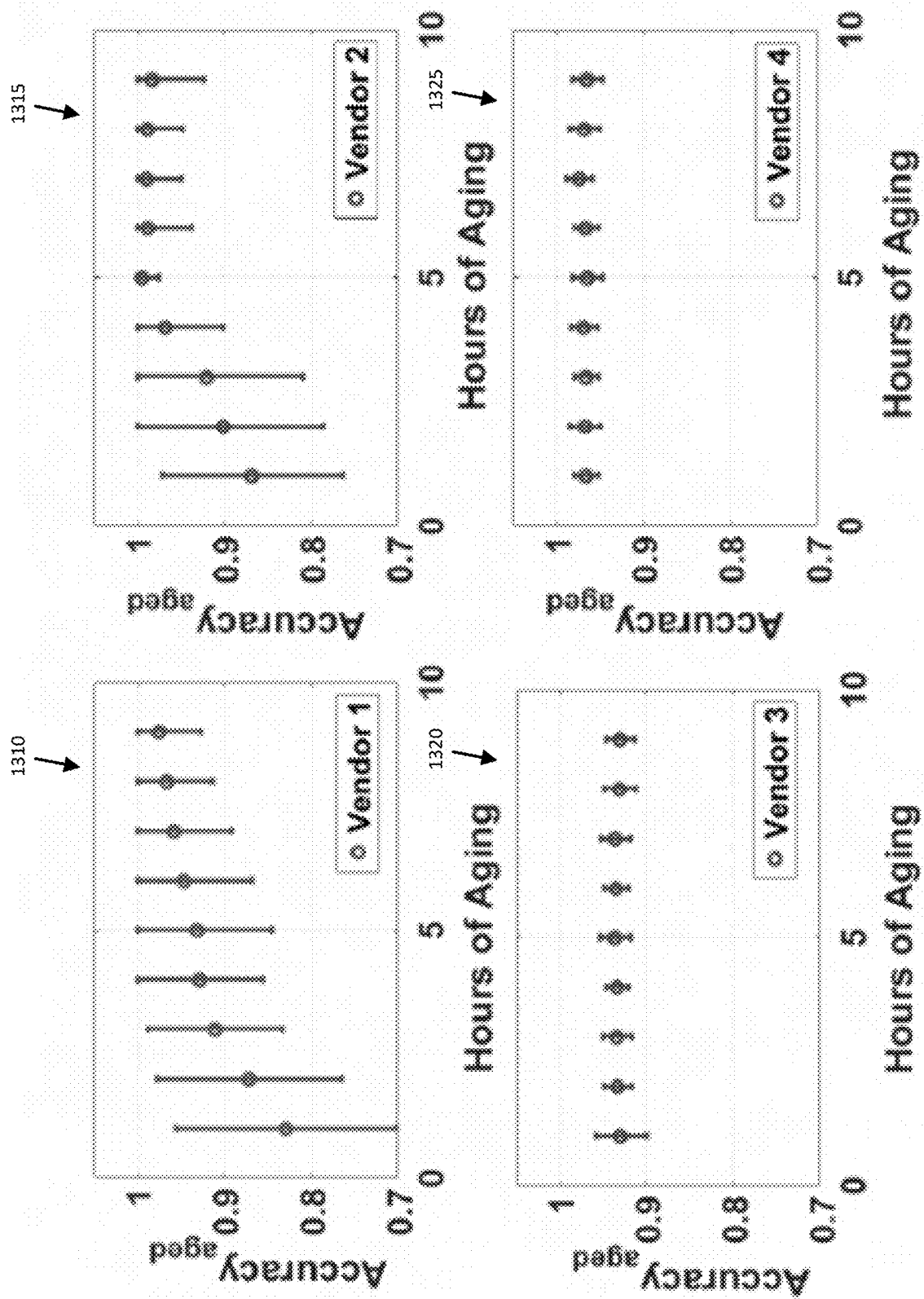
Figure 14:
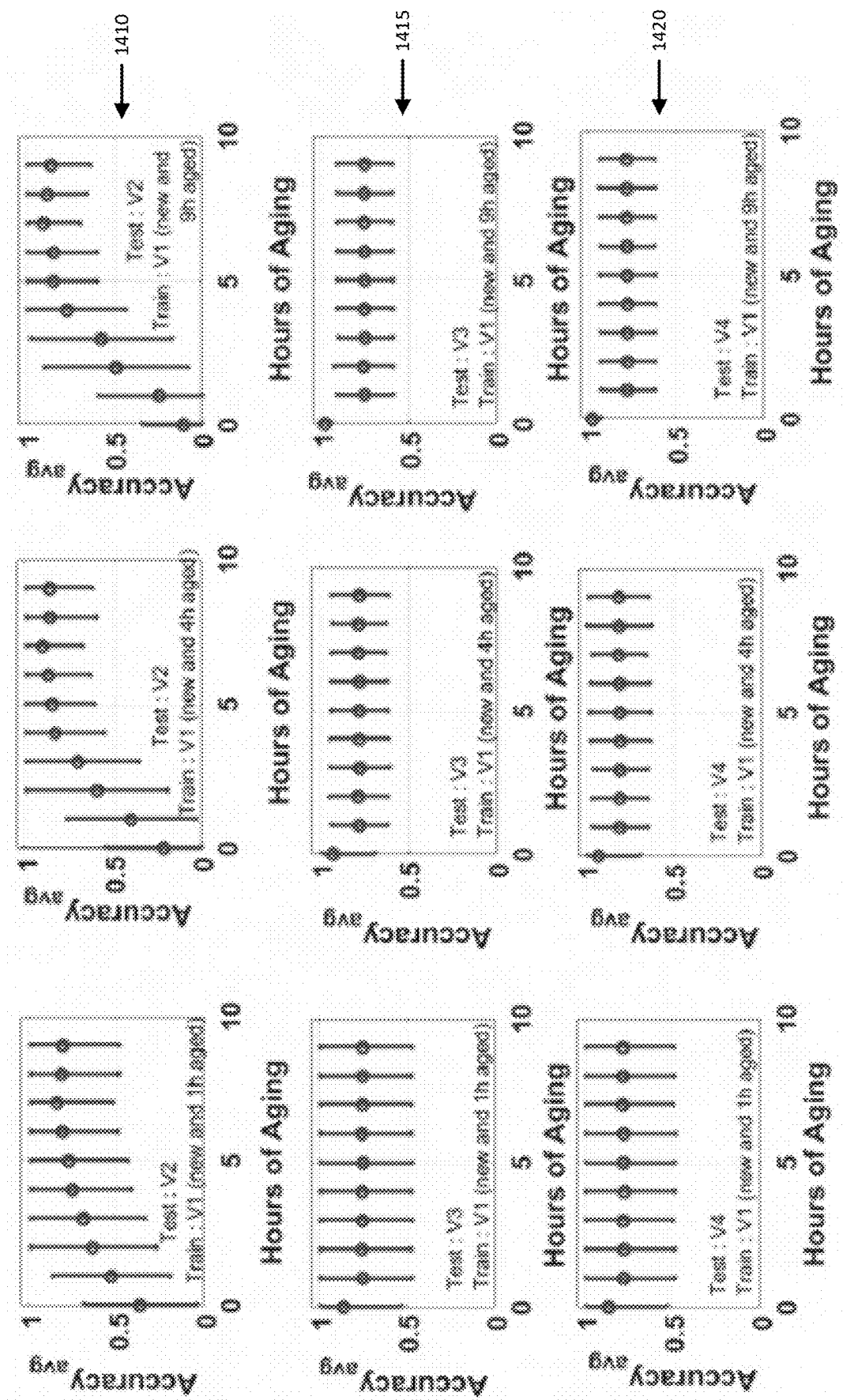
Figure 15:
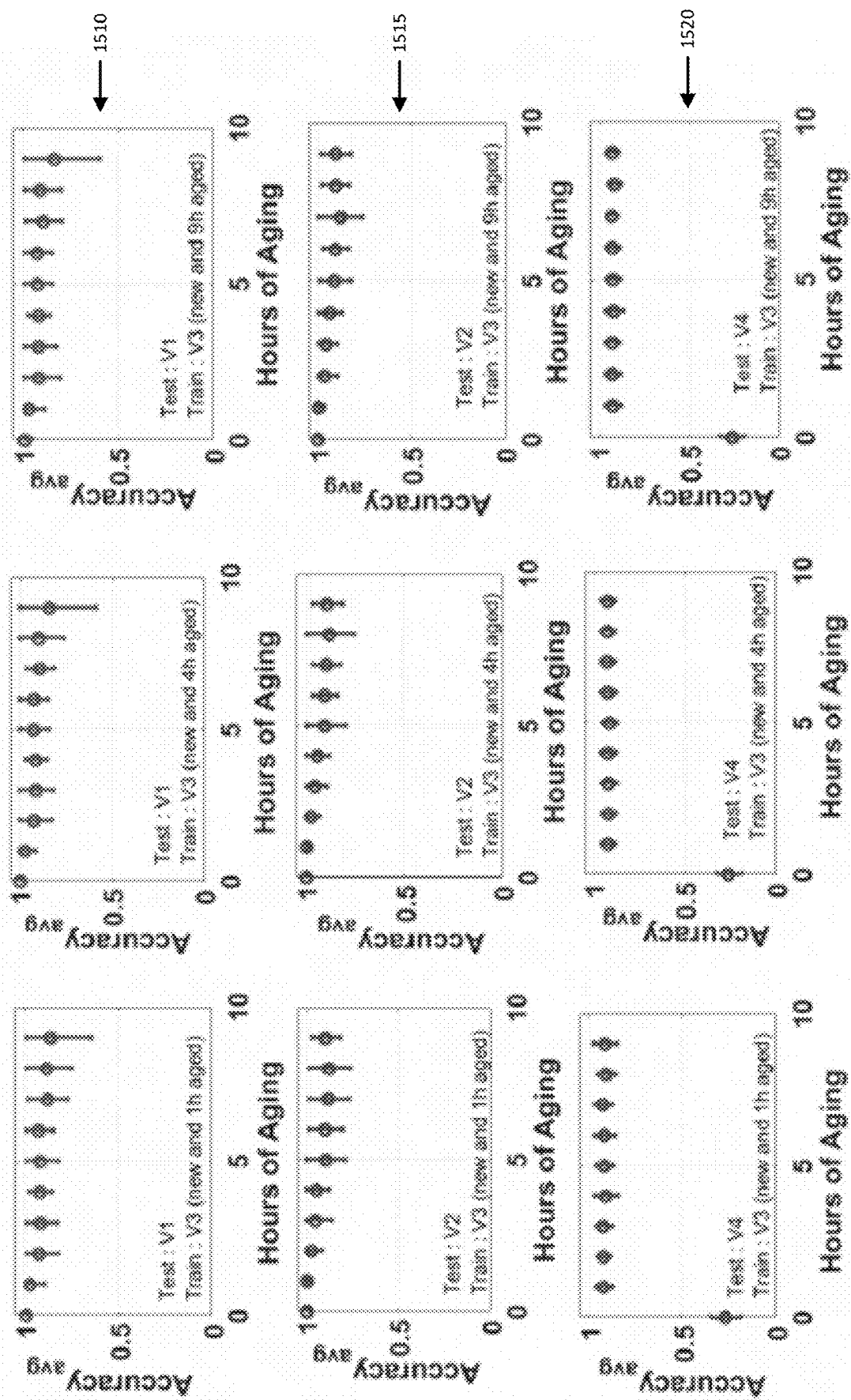
Figure 16:
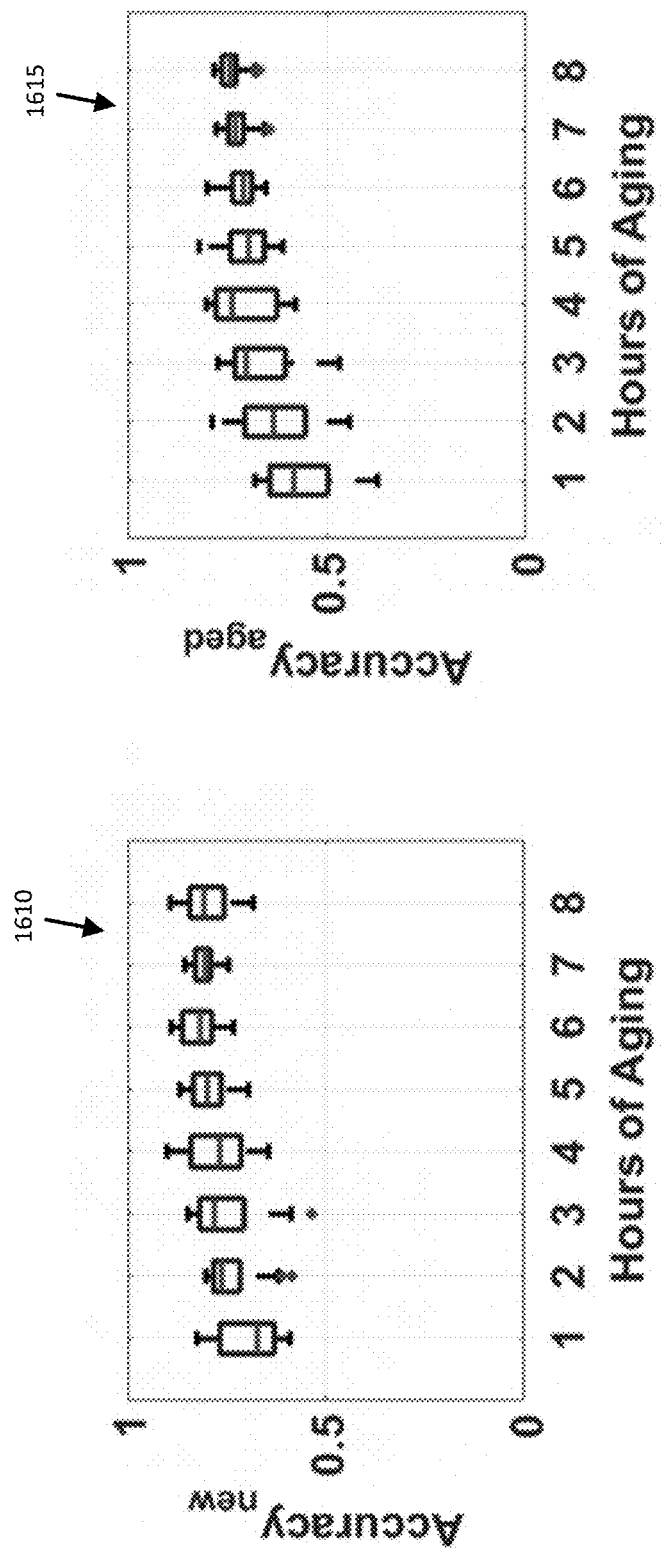
Figure 17:
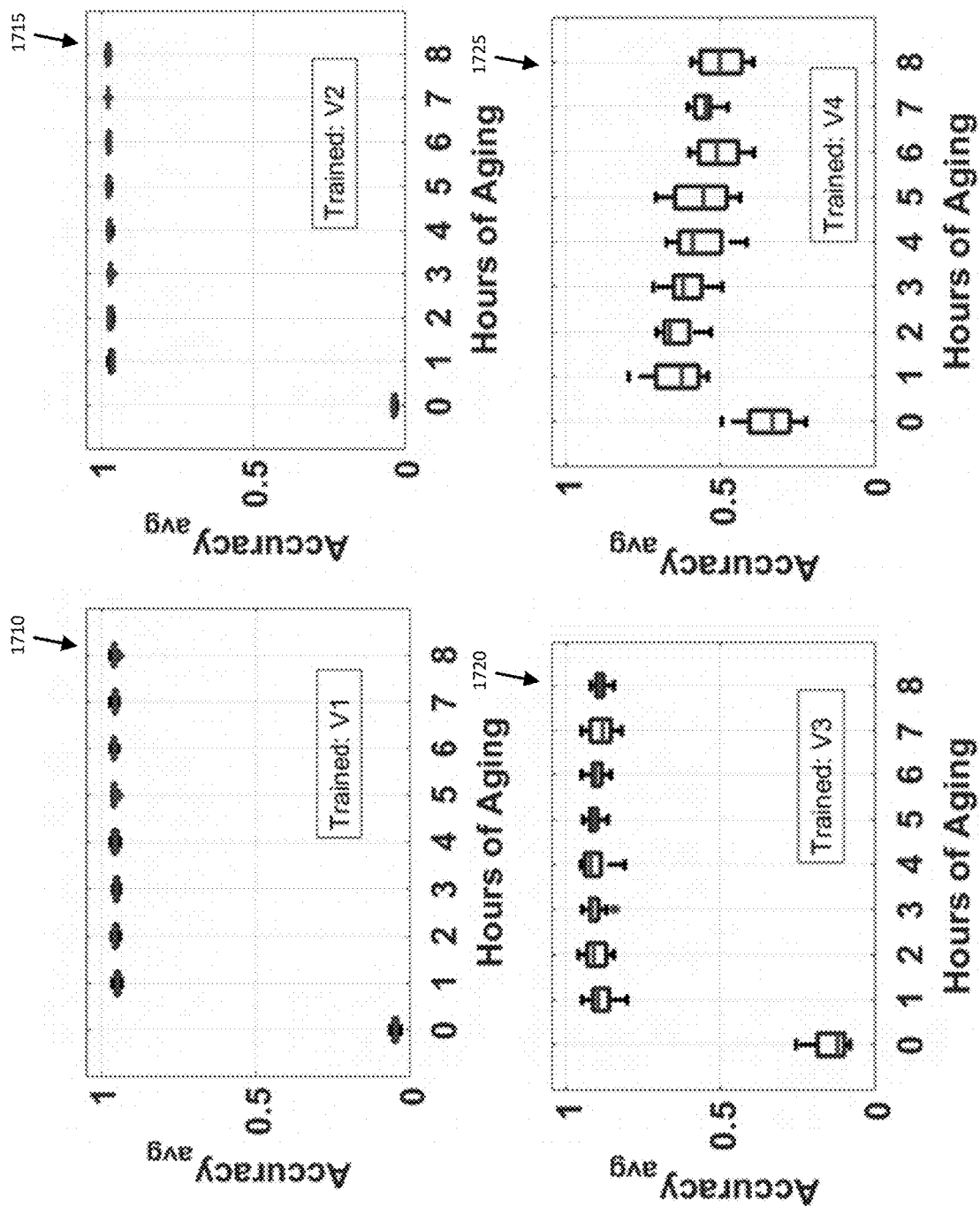
Figure 18:
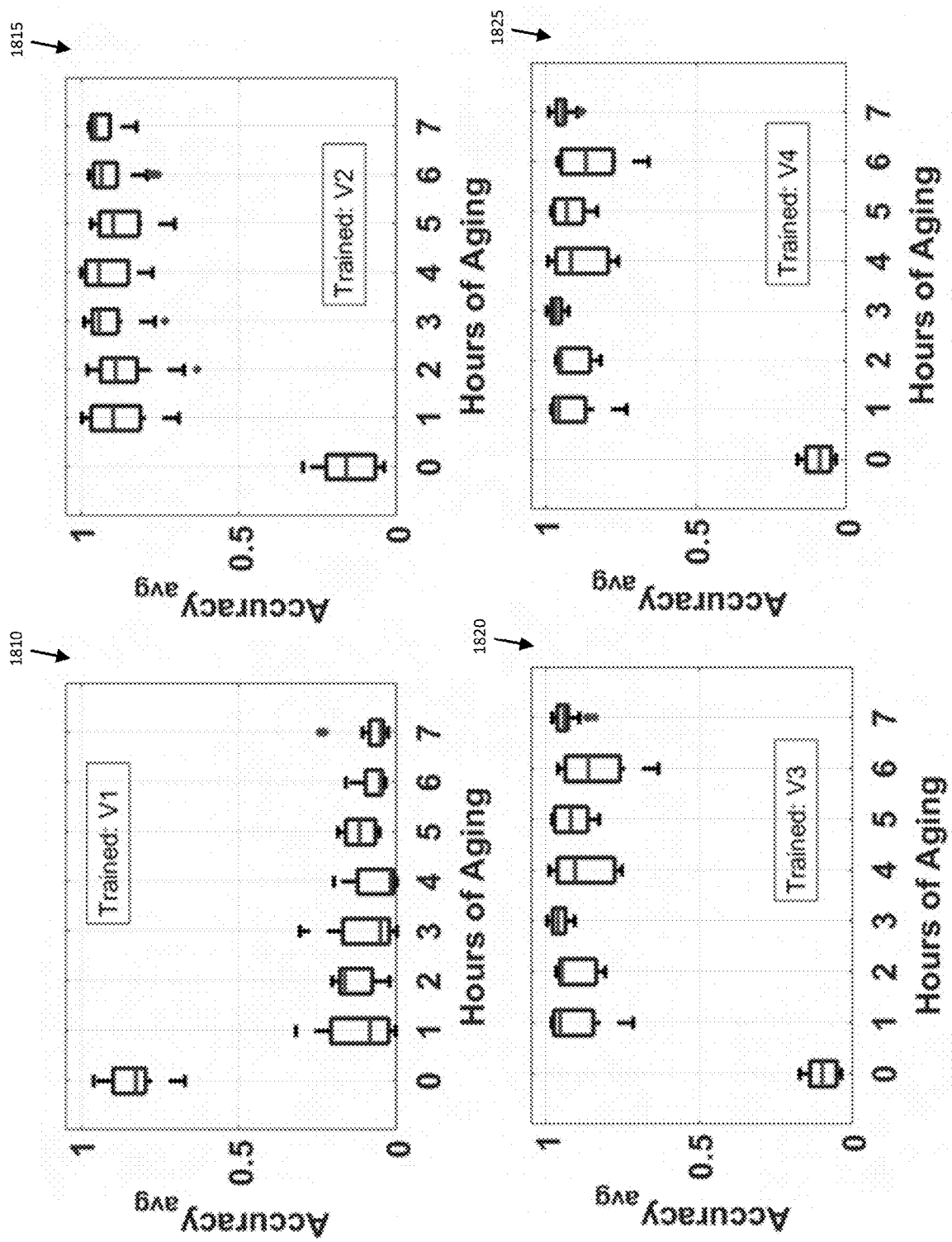
Figure 19:
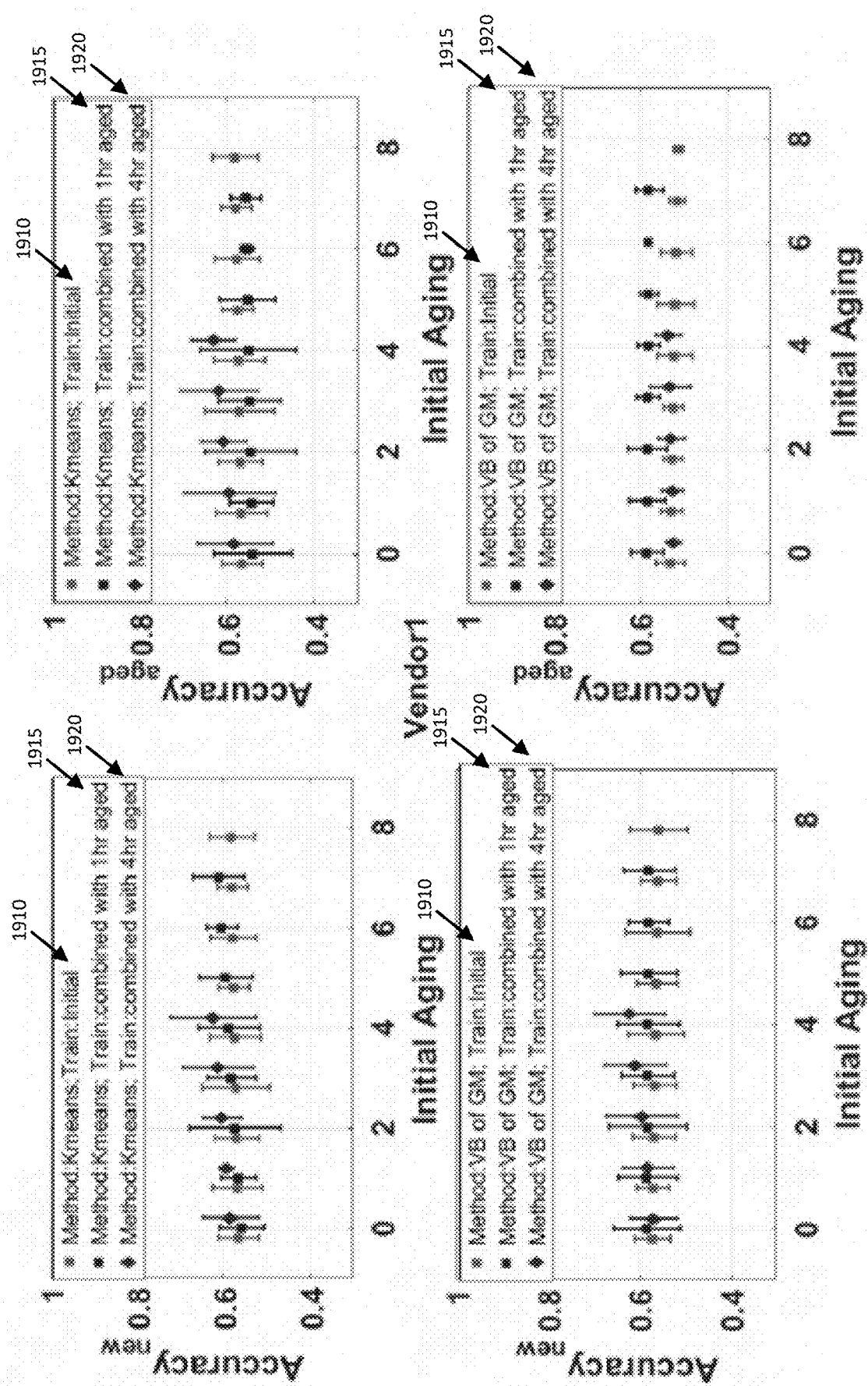
Figure 20:
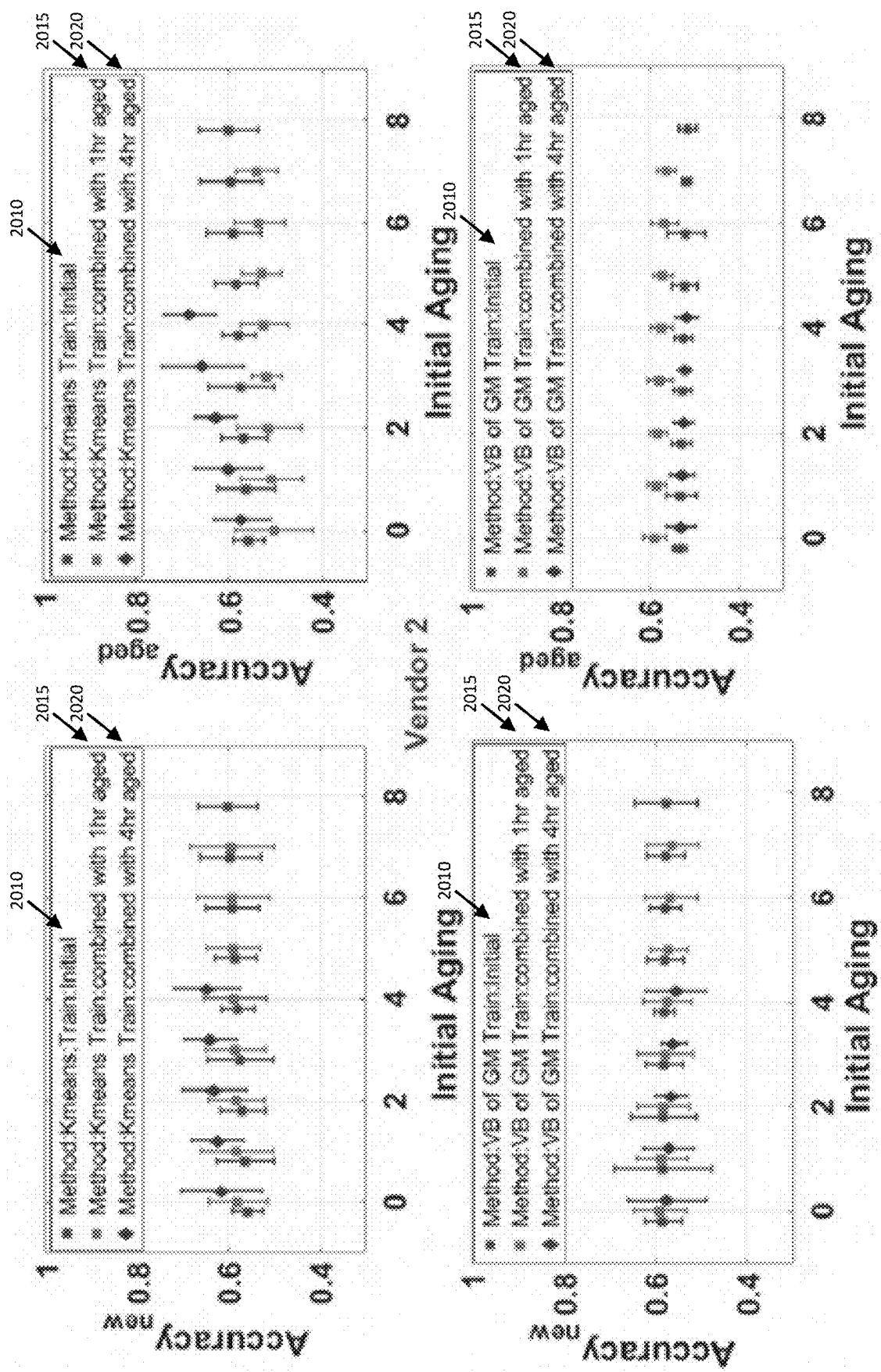
Figure 21:
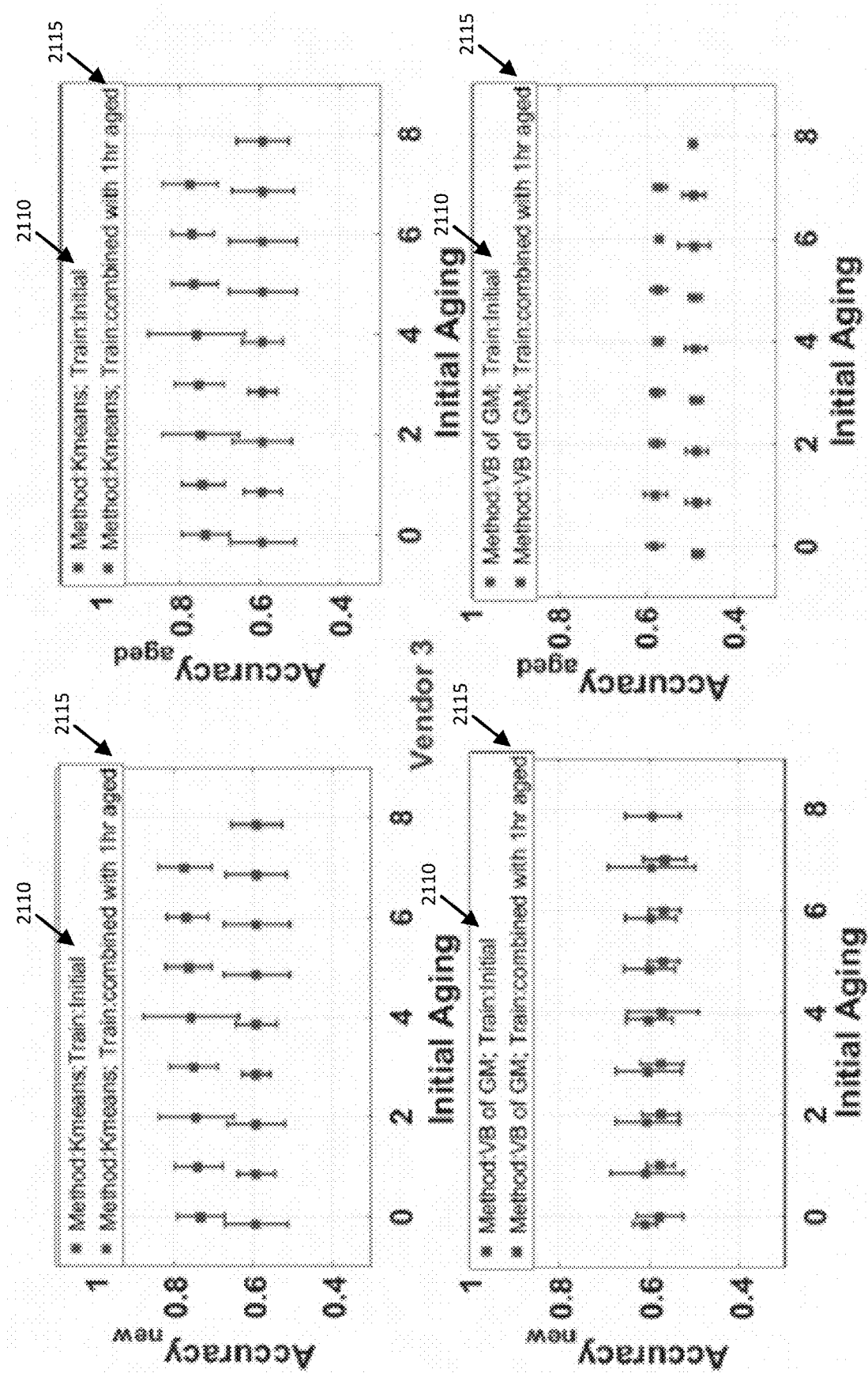
Figure 22:
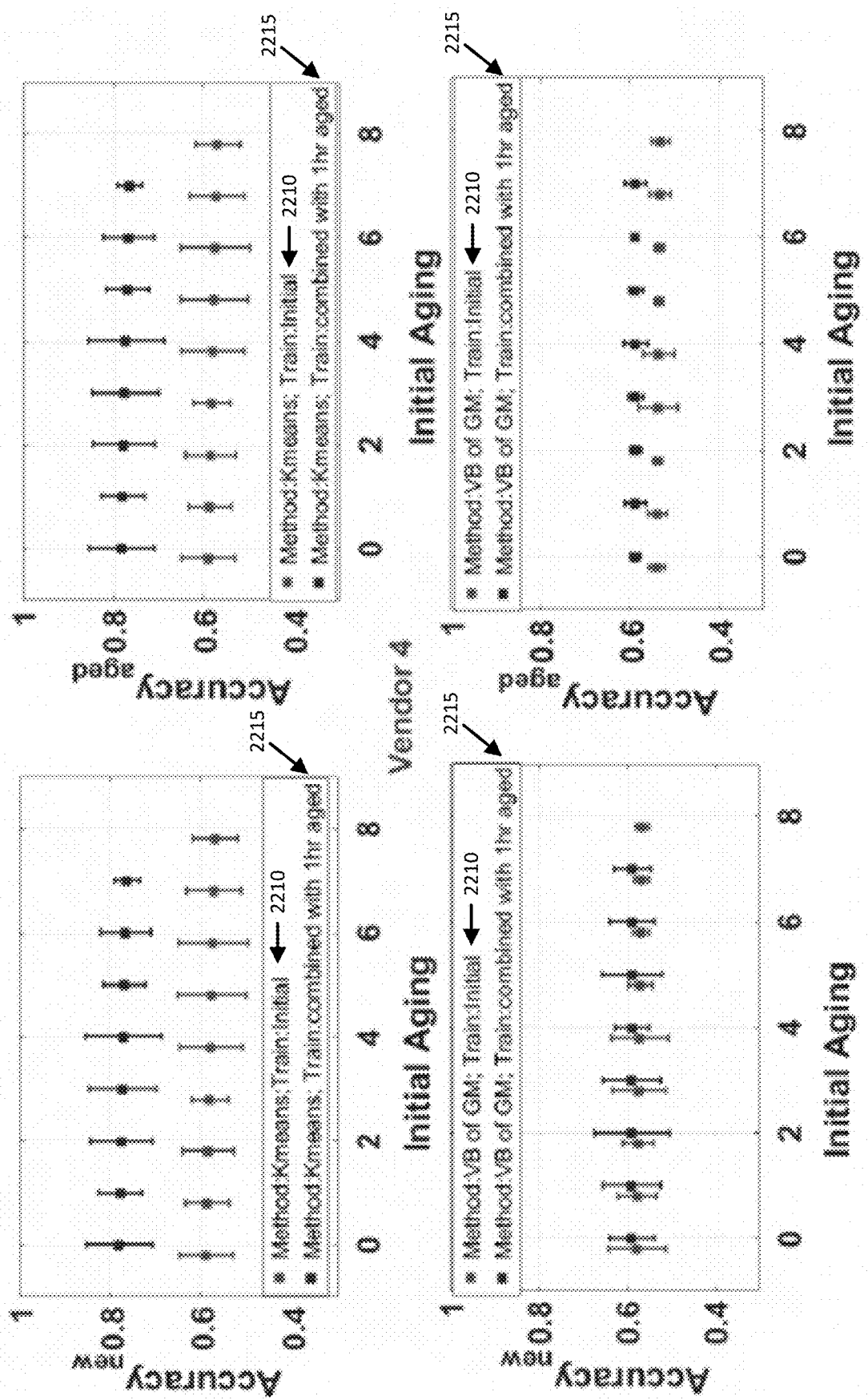
Figure 23:
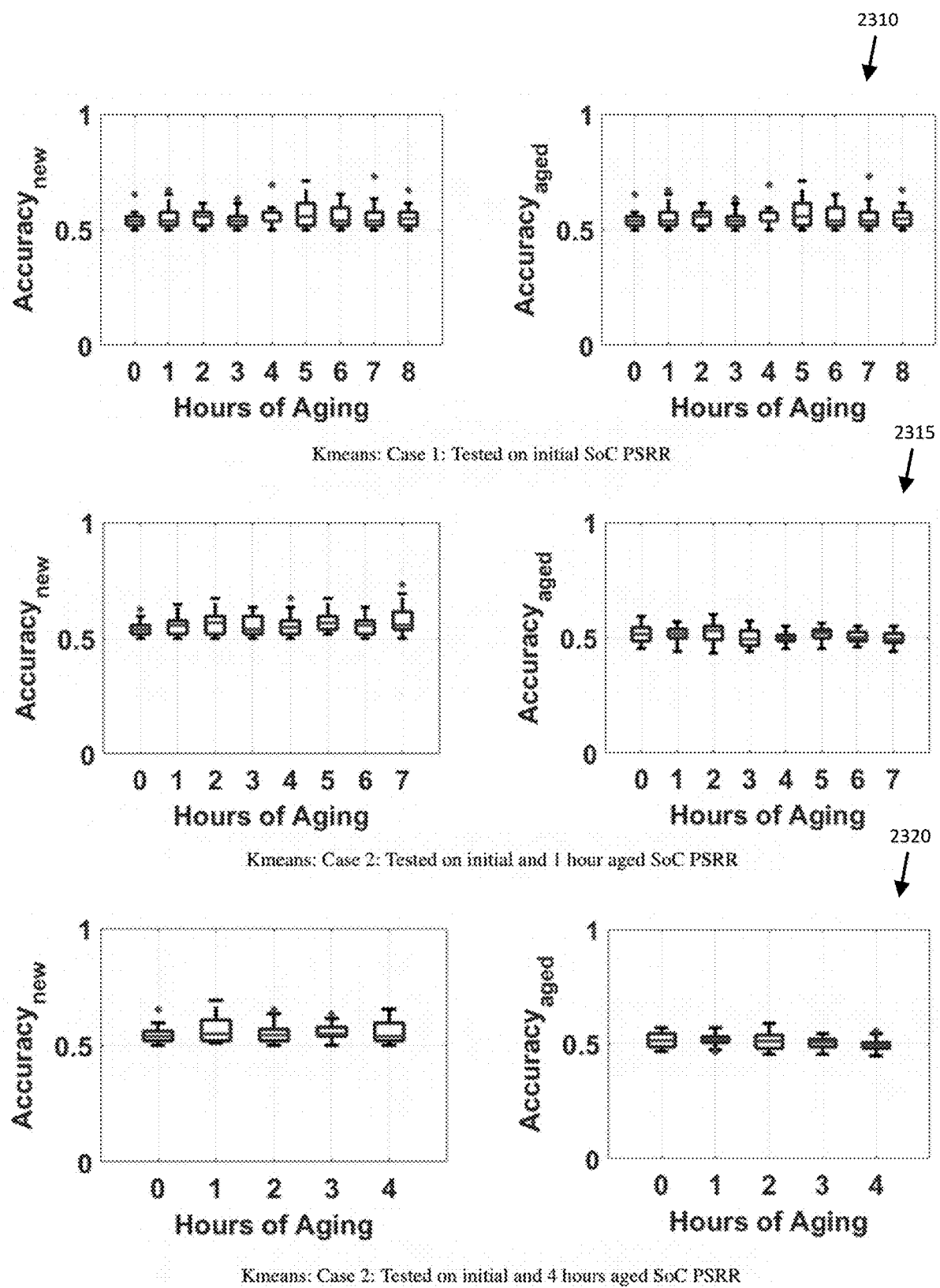
Figure 24:
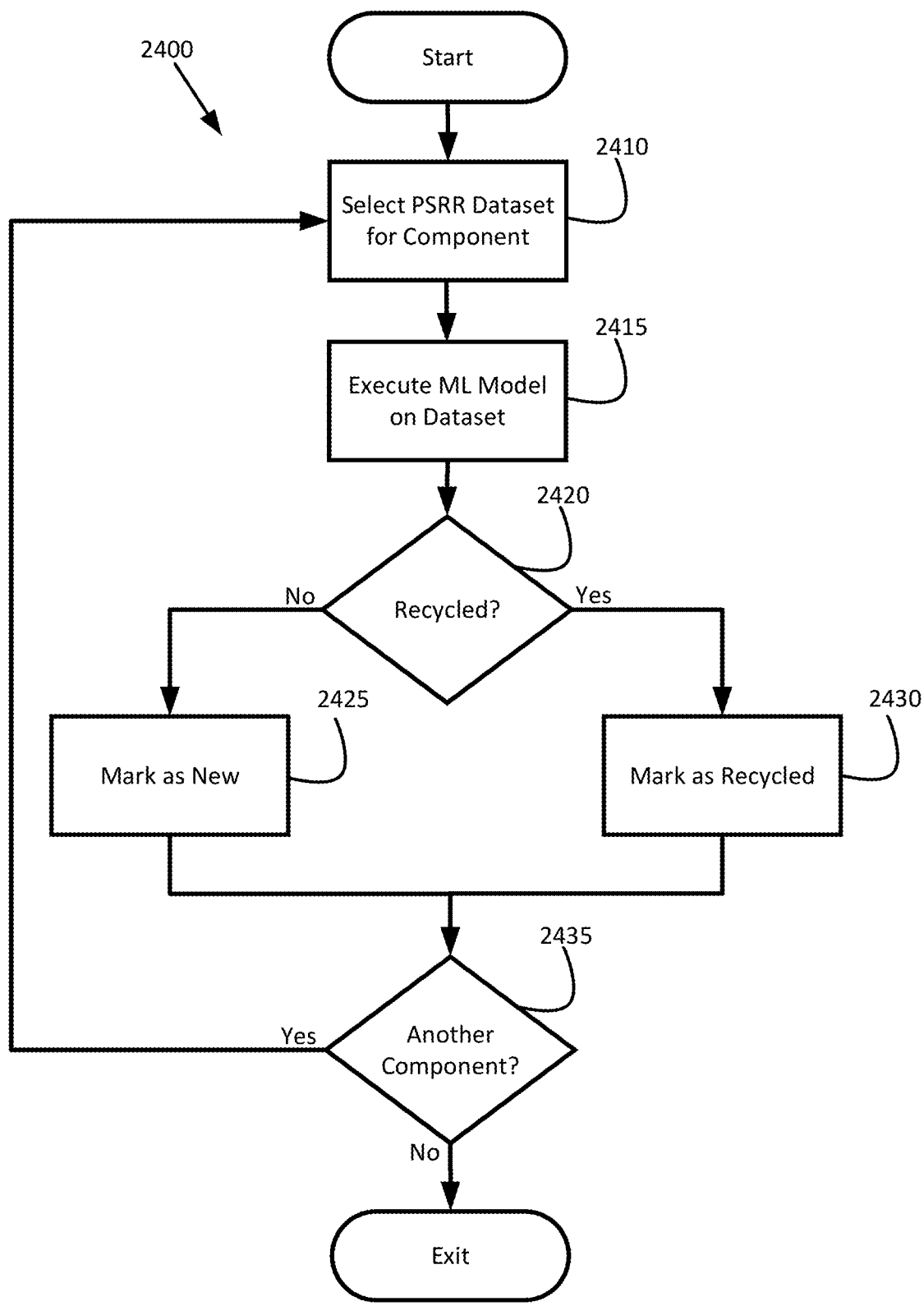

FIG. 9 a block diagram of an automated test setup that may be used to collect data from an LDO embedded in a SoC in accordance with various embodiments of the disclosure;

FIGS. 10A and 10B illustrate silicon data showing PSRR degradation distribution of original SoCs for one hour and four hours of accelerated aging;

FIG. 10C illustrate an aging profiled of an LDO embedded in a SoC;

FIGS. 11A and 11B illustrate an augmented distribution of an aging profile of chips obtained by applying PCA to an original SoC aging distribution;

FIG. 12 illustrates results of models detecting new LDOs that were trained using supervised machine learning;

FIG. 13 illustrates results of models detecting aged LDOs that were trained using supervised machine learning;

FIG. 14 illustrates results of models detecting new and aged LDOs that were trained using semi-supervised machine learning;

FIG. 15 illustrates results of models detecting new and aged LDOs that were trained using semi-supervised machine learning;

FIG. 16 illustrates results of models detecting new and aged SoCs that were trained using supervised machine learning;

FIG. 17 illustrates results of models detecting new and aged SoCs that were trained using semi-supervised machine learning;

FIG. 18 illustrates results of models detecting new and aged SoCs that were trained using semi-supervised machine learning;

FIG. 19 illustrates results of models detecting new and aged LDOs that were trained using unsupervised machine learning;

FIG. 20 illustrates results of models detecting new and aged LDOs that were trained using unsupervised machine learning;

FIG. 21 illustrates results of models detecting new and aged LDOs that were trained using unsupervised machine learning;

FIG. 22 illustrates results of models detecting new and aged LDOs that were trained using unsupervised machine learning;

FIG. 23 illustrates results of models detecting new and aged SoCs that were trained using unsupervised machine learning; and FIG. 24 provides a process flow for detecting recycled components such as recycled ICs and/or SoCs according to various embodiments.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application.

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Brief Overview of Various Embodiments

Various embodiments of the present disclosure are directed to detection of recycled (e.g., possibly counterfeit) integrated circuits and system-on-chips (ICs and SoCs, or otherwise referred to herein as components). Specifically, embodiments aim at detecting recycled counterfeit chips by evaluating the degradation of power supply rejection ratio (PSRR) of a low drop-out regulator (LDO), a principal component of the power supply of many chips. Since the power supply is a universal component in most chips, various embodiments can prove effective for identifying counterfeit for a large number of chips. As discussed further herein, embodiments of the disclosure involve observing the degradation of the PSRR of LDOs used for various chips and applying machine learning (ML) models to classify chips as either recycled or new. Accordingly, the detection of aging effects on an LDO through the use of various embodiments can allow for identifying of recycled chips at virtually zero cost.

Low Dropout Regulators (LDOs)

An LDO is a type of linear regulator capable of maintaining an output voltage even when the input is very close to the output (low drop-out). Drop-out voltage is defined as the input-to-output differential voltage, where the regulator fails to regulate the output voltage until further reduction of the input voltage. The role of an LDO is indispensable in the power supply of many SoC/IC. It provides isolation between the input and output, thus rejecting noise and ripples (glitches) in the input power supply at the output to provide a stable, low noise, fixed output voltage.

Figure 1:
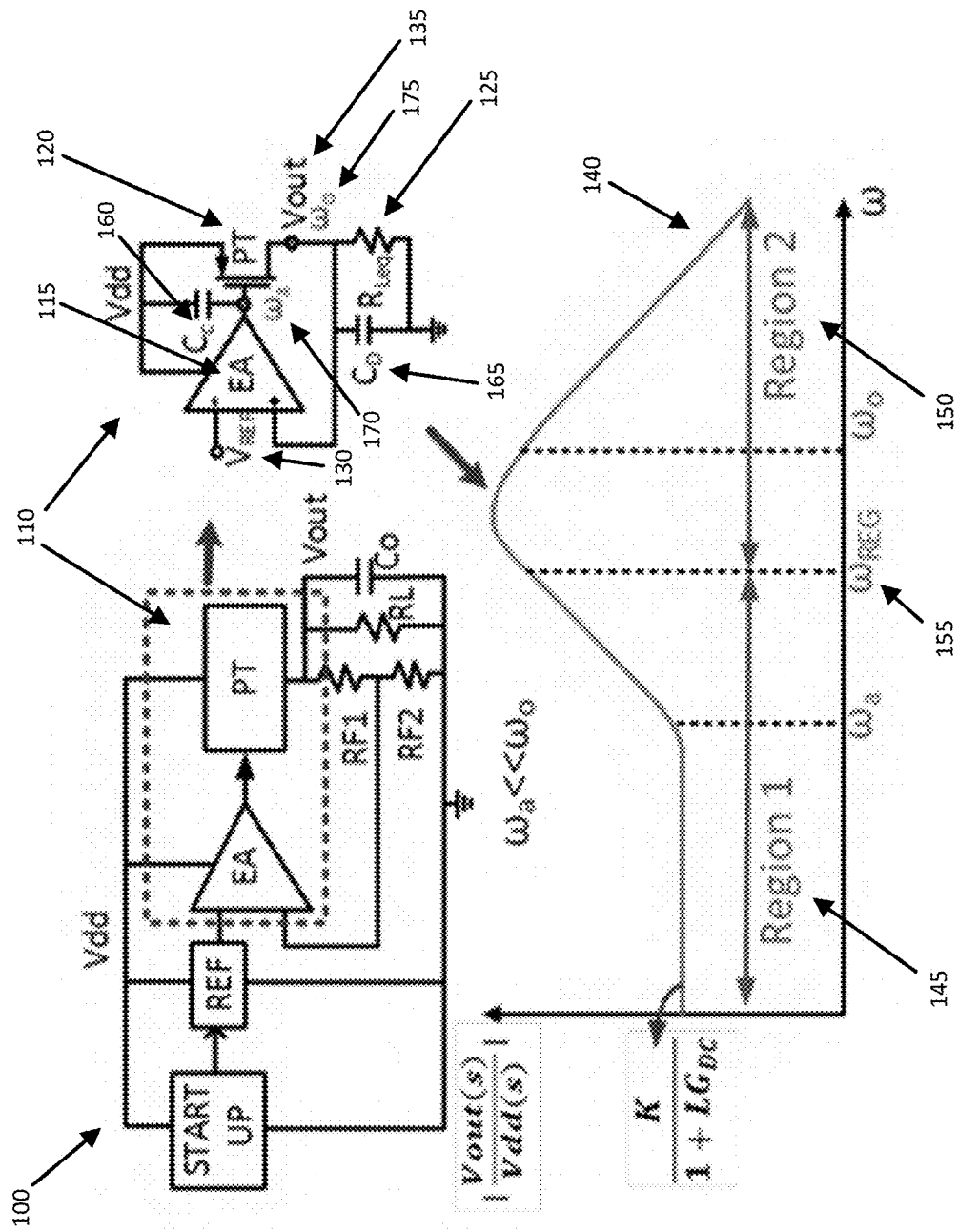
FIG. 1 illustrates a block diagram of an exemplary low dropout regulator (LDO) with PSR (linear scale) curve.

As shown in FIG. 1, the block diagram 100 of an LDO comprises of a feedback loop 110 with an error amplifier (EA) 115, a pass transistor (single n-channel metal oxide semiconductor (NMOS) or p-channel metal oxide semiconductor (PMOS)) 120, and a resistor divider 125. A bandgap circuit provides a fixed reference voltage 130 to the EA 115. The pass transistor (PT) 120 acts as a variable resistor controlled by the EA 115, and the feedback resistor divider circuit 125 level-shifts the output voltage 135 to the EA input. The EA 115 monitors the error between the input and the output voltage 135 and accordingly controls the gate-to-source voltage ($v_{gs}$) of the PT 120 to regulate the output 135 at a fixed voltage. If the feedback voltage is smaller than the reference voltage, then the gate voltage of the PT 120 is lowered, increasing the $v_{gs}$ as well as the current flowing through the PT 120, thus increasing the output voltage 135. If the feedback voltage is higher, than the reference voltage, $v_{gs}$ of the PT 120 decreases, reducing current and output voltage 135. The drop-out voltage for a generic LDO, as shown in FIG. 1, is the drain-to-source voltage drop, which appears across the PT 120. One of the major performance metrics of an LDO is its capability of rejecting the ripples of the input supply at its output. This metric is known as the power supply rejection ratio (PSRR) of the LDO. The ripple can originate from the power supply or from a DC/DC converter or even due to sharing an input supply between different circuit blocks in the system. PSRR is expressed as $$PSRR = 20\log\left(\frac{V_{out}}{V_{in}}\right)$$

where $V_{out}$ and $V_{in}$ are magnitudes of voltage glitch at output and input, respectively. Apart from PSRR, the quality of voltage regulation provided by an LDO is specified by metrics like transient line regulation and load regulation. Metrics like power efficiency and current efficiency determine the power and current consumption efficiency of the LDO.

General Concepts of Transistor Aging

Transistor aging is one of the major causes of reliability issues faced by modern chips. Transistor aging is the result of trapped charges and broken bonds at gate dielectric interfaces, which increases threshold voltage ($V_{th}$) and switching activity, thereby deteriorating transistor performance in scaled modern devices. Bias temperature instability (BTI) results in a positive shift in the absolute value of $V_{th}$ in both PMOS and NMOS. BTI is the condition often referred to as DC stress when the PMOS/NMOS has already pulled up/down, but the gate is still biased in strong inversion. The drain-to-source voltage becomes zero signifying a negligibly small lateral electric field. For PMOS, the condition is called negative BTI (NBTI), whereas, for NMOS, it is positive BTI (PBTI).

Hot carrier injection (HCI) occurs when the transistor is switching under strong inversion ($|v_{gs}|\approx V_{dd}$) and the lateral electric field is high ($|v_{ds}|\approx V_{dd}$). During transistor switching, the accelerated carriers drift towards the drain under the influence of the lateral electric field. Channel hot carriers (CHC) are generated when the source-to-drain current flowing through the channel reaches energy above the lattice temperature. These hot carriers gain energy and get injected into the gate oxide, forming charge traps. The charge traps cause a shift in the device performance like $V_{th}$, transconductance, and saturation current of the transistor. HCI degradation increases by a factor of $t^{1/2}$ (where t is time) and BTI increases as a factor of $t^n$ where n=0.1 to 0.2. Since the multiplicative constant of HCI is much smaller than that of BTI, BTI overshadows HCI for a short amount of time. Long term, HCI may cause equal or higher degradation in device parameters than BTI.

Transistor Aging on LDO PSRR

The effect of transistor aging in an LDO can be understood by considering the transfer function of its PSRR. The power supply rejection of a generic LDO, PSR in a linear model, can be represented as:

$$PSR = \frac{v_{out}(s)}{v_{dd}(s)} = \frac{K\left(1 + \frac{s}{\omega_0}\right)}{\left(1 + \frac{s}{\omega_0}\right)\left(1 + \frac{s}{\omega_0}\right) + A_G A_o} \quad (1)$$

$$= \frac{K}{\left(1 + \frac{s}{\omega_0}\right)(1 + LG(s))} \quad (2)$$

where $$K = \frac{R_{Leq}}{R_{Leq} + r_{dsP}}, \omega_n = \frac{1}{ro_{ea} * C_c}, \omega_o = \frac{1}{(r_{dsP}\|R_{Leq}) * C_D}$$

$$A_a = g_{ma} * r_{oa}, A_o = g_{mP}(r_{dsP}\|r_{out}) \text{ (\|denotes parallel)} \quad (3)$$

$$g_m \propto v_{eff}, v_{eff} = v_{gs} - V_{th} \quad (4)$$

LG is the loop gain of the LDO feedback loop; $r_{dsP}$ refers to the drain to source small signal resistance of the PT 120; $ro_{ea}$ is the small signal output resistance of the amplifier; the equivalent output resistance at the node $v_{out}$ is taken as $r_{out}$. The EA 115 and the PT 120 have respective transconductances of $g_{ma}$ and $g_{mP}$ and loop gains $A_a$ and $A_o$. The pole due to the node capacitance ($C_c$) at the output of the EA 115 originates at frequency $\omega_a$ while the pole due to the equivalent output capacitance ($C_D$) at the output node originates at frequency $\omega_o$. $R_{Leq}$ is the equivalent resistance at output and $\omega_a$ is assumed as the dominant pole.

Returning to FIG. 1, the PSRR curve 140 of most LDOs can be divided into two distinct regions. The first region (Region 1 145) appears in the low and mid frequency range up to the unity bandwidth frequency $\omega_{reg}$ where the DC loop gain becomes the LDO. The second region (Region 2 150) is in the higher frequency range located higher than the regulator unity bandwidth frequency. In Region 1 145, the PSRR is actively controlled by LG. In Region 2 150, the LG has little effect and the PSRR is dominated mainly by parasitics from input to output, the output capacitor $C_o$, PT impedance, and the PCB.

PSRR Aging in Region 1

As shown in Equation (1), the absolute value of PSR increases as LG decreases with increasing frequency. This signifies that the capability of the LDO to reject ripples decreases. The smaller the PSR, the better the rejection is as less ripples from $V_{dd}$ appear at $V_{out}$. High LG of the LDO ensures better rejection in Region 1 145. Also shown in Equation (1), the LG of the LDO is directly proportional to the individual open loop gains of the EA 115 and PT 120, respectively. The open loop gain, on the other hand, is directly proportional to the transconductance of the PT 120 and the input transistors of the EA 115 as shown in Equation (3). Since $V_{th}$ increases with both BTI and HCI, transconductance $g_m$ and the overall loop gain of the LDO (see Equations (4) and (3)) are degraded, thus impacting PSRR.

In particular chips, the transistors are biased to operate in the saturation region for maximum small signal gain and linearity. This configuration causes more HCI degradation. They also show that the degradation (increase) in $V_{th}$ is enhanced due to the presence of feedback loops in circuits. The feedback loops dynamically vary the operating condition in a circuit to stabilize the circuit operation thus aging the transistors more.

Lastly, the configuration of transistors also impacts respective aging degradation. Certain configurations like diode connected transistors where $V_{gs}=V_{ds}$ receive the worst stress as shown for the technology node of 65 nm and 28 nm. A generic LDO also includes a feedback loop which continuously monitors the error voltage (difference between expected and actual output voltage) at the output. This may enhance the stress on the input transistor of the EA 115 and the pass transistor increasing the respective $V_{th}$ and further accelerating transistor aging. Also, presence of diode connected transistors in the EA 115 as well as in current biasing circuit can further aggravate aging.

PSRR Aging in Region 2

At the LDO unity gain bandwidth ($\omega_{REG}$ 155 in FIG. 1), LG=1 and the PSRR curve 140 mainly behaves as a resistor divider (K in Equation 3). Thus, LG has less/no impact while the capacitances including the parasitic capacitance affects the PSRR curve 140. The major capacitances include $C_C$ 160 and $C_D$ 165 as shown in FIG. 1; which are effective in formation of the poles at $\omega_a$ 170 and $\omega_o$ 175. With accelerated aging, the gate to source and gate to drain capacitances of the PT 120 may change leading to a shift in the pole frequencies (see Equation 3).

Figure 8A:
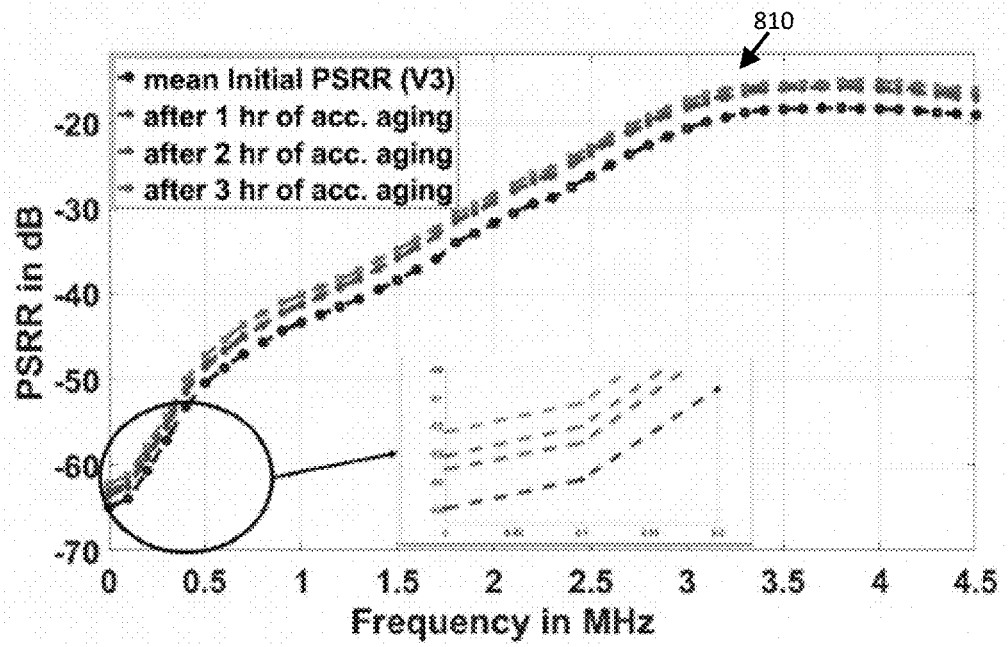
FIGS. 8A and 8B illustrate silicon data showing mean PSRR degrading of LDOs across various hours of accelerated aging for various vendors.
Figure 8B:
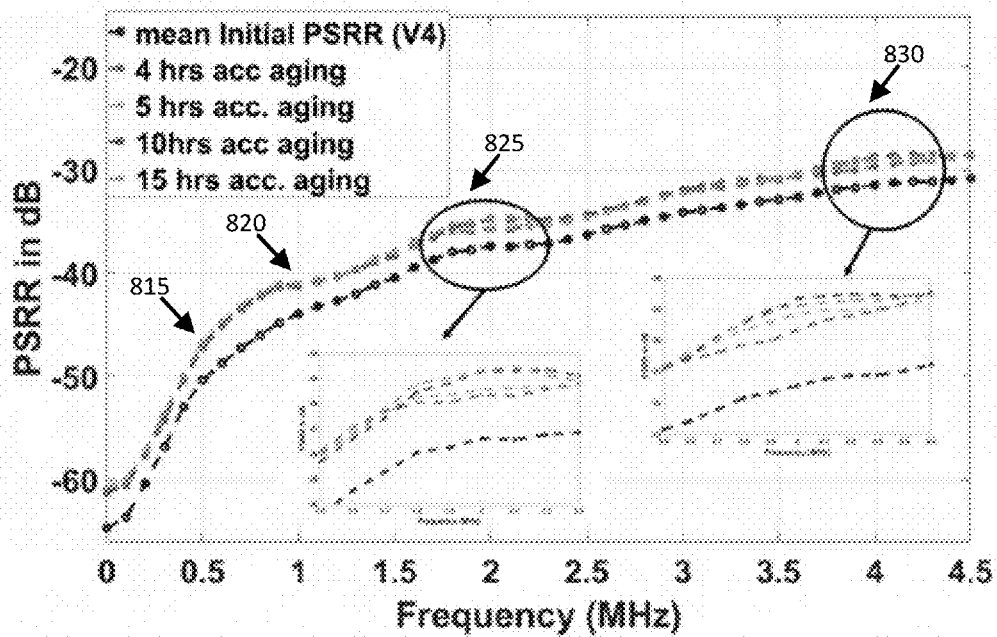

This phenomena of the variation of gate capacitance ($C_{gd}$ and $C_{gs}$) with respect to hot carrier degradation has been exemplified for a 64-Mb DRAM chip where an electron beam probe detected the difference in gate capacitance before and after hot-carrier stress for the DRAM chip. The experimental results showed that the precharge time of the DRAM chip increased from 20 ns to 22 ns after a 47-hour hot carrier stressing, which demonstrated significant change in gate capacitance. As the PT 120 is usually a huge transistor in generic LDO design, the increase in the capacitance may substantially change the structure of the PSRR curve 140. Turning briefly to FIG. 8B, such changes are shown for a vendor (V4) where the structure of PSRR curve is changing with aging. Certain peaks appearing at approximately 1.2 MHz 820, 2.3 MHz 825, and 4 MHz 830 for the vendor (V4) are not present in the initial PSRR curve. Possibly these are due to the shifting of non-dominant poles and zeros with the changes in gate capacitance of the PT 120 due to HCI as well as BTI.

Recycled SoC Detection

Recycled IC detection has been a targeted research initiative, and there are many methods that have been proposed before to detect IC recycling. Some approaches use statistical methods to detect degradation. Some use low-cost on-chip sensors called CDIRs to detect the transistor aging due to recycling. While they are very effective, most of these sensors require additional circuitry adding to hardware design efforts and increased silicon area. Some other detection methods include side-channel analysis, including power and current analysis, require golden data. Compared to the recycled detection of standalone ICs, much less work has been done to detect recycled SoCs. A framework has been proposed in previous work to detect recycled SoCs by an aging-sensitive static random-access memory (SRAM) selection algorithm. This framework is applicable to SoCs consisting of embedded SRAMs and can be applied at near zero-cost to most SoCs. While the above holds for many digital SoCs, which contains embedded SRAM, the framework proposed in the previous work is not likely applicable to purely analog or analog-mixed signal (AMS) SoCs that do not contain embedded SRAM memories. Thus, unlike existing recycled IC detection processes, various embodiments of the disclosure involve using a power supply component like an LDO, which is present in most digital, analog-mixed signal SoCs as well as stand-alone ICs and thus can be universally applied. Further, particular embodiments are free from enrollment steps and do not require any additional silicon area or memory, making such embodiments often applicable even to legacy and commercial-off-the-shelf (COTS) components.

Different Types of Power Supplies in ICs

Increased scaling and requirement of efficient power supply units have revolutionized the power architecture in electronic circuits. Power converter systems in ICs/SoCs mainly include a DC-DC converter. The power from DC-DC converters is either stepped up (boost) or down (buck) to supply a required amount of current at the load, regulating the output voltage with varying load, line, and pressure-voltage-temperature (PVT) variations. There are two different topologies of power converters used in SoCs: switching topologies; and linear topologies. Switching topologies use passive storage elements like capacitors and inductors to convert and store the power, whereas linear topologies use resistive elements to dissipate the power. Switching mode power supplies (SMPS) consist of an inductor and capacitor (LC tank) circuit which stores or dissipates the power and charges the capacitor at the output. Different types of SMPS converters include buck and boost converters, etc. Another type of switching topology includes switch capacitor (SC) power converters, which are often referred to as charge pumps and mainly use a capacitor and a switch for the conversion. Linear power converters are used to convert a DC source from one voltage level to another by dissipating the excess power in the resistive output device. An LDO is an example of a linear power converter, which can only be used to step down from a given voltage level and fail to step up to a higher voltage level. With increased technology scaling leading to the development of low power designs, LDOs are used in most modern SoCs to step down the off-chip/battery supply voltage to lower levels for the majority of the embedded digital and mixed-signal blocks. A comparison of the different converters is shown in Table 1. It can be seen that LDOs provide proper regulation with small physical area requirements, which makes it suitable for on-chip integration specifically for SoCs. A detailed explanation of the general architecture of the SoC power supply with LDOs is given below.

TABLE 1

Comparison of switching mode power supplies (SMPS), switch capacitor (SC), and LDO power converters.

| Power converter | SMPS | SC | LDO |
|---|---|---|---|
| Step-up conversion | Possible | Possible | Not possible |
| Power efficiency | High | Medium | Limited to $\frac{V_{out}}{V_{in}}$ |
| Load regulation | Good | Poor | Good |
| Physical Area | Large | Medium | Small |
| Applications | Microprocessors, DSPs, SRAMs, hard-discs | EEPROM, DRAM, flash, and mixed-signal | DRAM, SoCs |

General Architecture for Power Supply in SoCs

Figure 2:
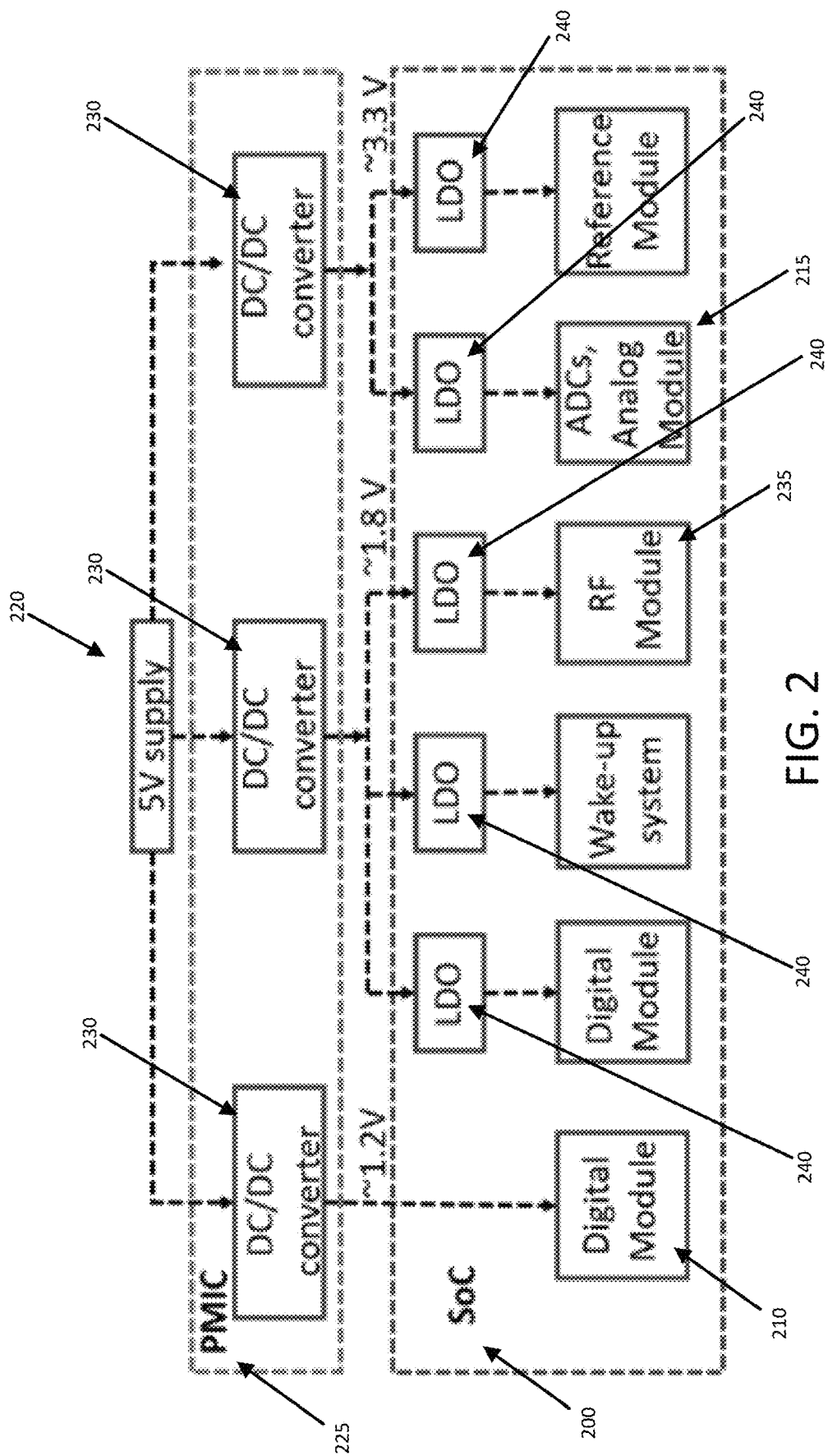
FIG. 2 illustrates a block diagram showing general architecture of a power supply in a SoC.

A generic block diagram of a power supply architecture that can be used in modern SoCs is provided in FIG. 2. The SoC 200 consists of multiple blocks that require different reference or supply voltages due to original specifications. The on-chip voltage supply is significantly lesser than the off-chip supply. It ranges from a fraction of volts for digital modules 210 to a couple of volts for high-precision analog to digital convertors (ADCs), buffers, and analog modules 215. The supply voltage 220 is provided to the power management integrated circuit (PMIC) 225, which mainly consists of DC-DC converters 230 used to up-convert or down-convert the supply voltage according to the requirement of individual sub-circuits. There can be various sub-circuits associated with an SoC 200, including digital 210, ADCs/analog 215, RF modules 235, etc., as shown in FIG. 2. Each of these modules requires their supply voltage levels, provided by the DC-DC converters 230 and the LDOs 240. The LDOs 240 perform a major task in these systems of isolating the SoC power from the PMIC 225. For AMS blocks, suppression of the power supply noise is critical and thus requires LDOs 240, which can provide a ripple-free regulated output by suppressing the power supply noise appearing at the output of the battery or the DC-DC converter 230. In digital blocks, there is a substantial amount of switching noise, which should be prevented from getting coupled at the DC-DC converter's output. An LDO 240 also provides this reverse-isolation, which prevents this switching noise from appearing at the converter outputs. Thus, the main functionality of an LDO 240 includes ripple suppression, isolation, and noise regulation, making LDOs 240 an important component in the power management units (PMUs) of SoCs 200.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Figure 3:
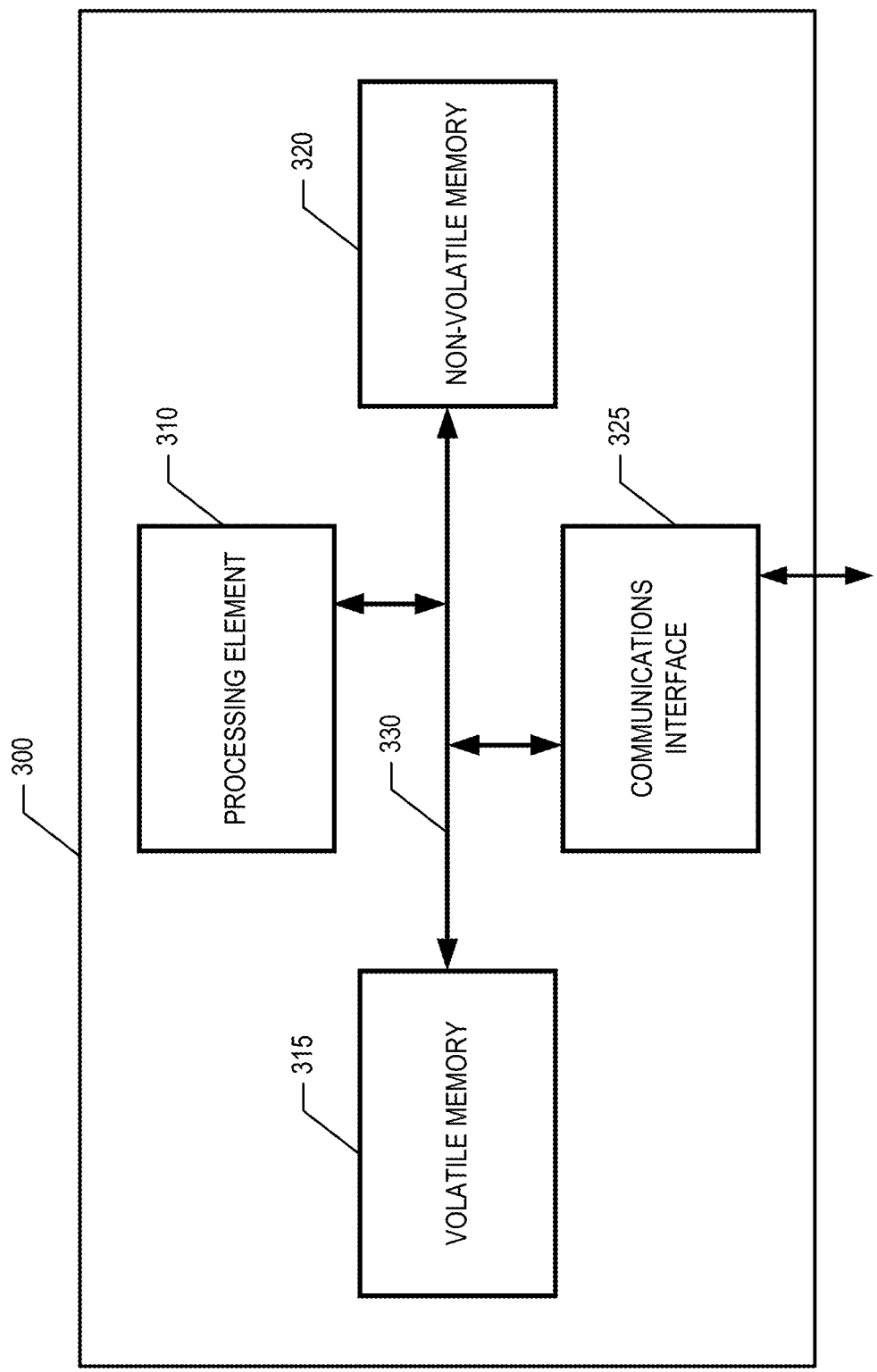
FIG. 3 is a schematic of a computing entity that may be used in accordance with various embodiments of the present disclosure.

FIG. 3 provides a schematic of a computing entity 300 that may be used in accordance with various embodiments of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present disclosure when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

Accordingly, various functionality described herein may be carried out on a computing entity 300 such as described in FIG. 3. Accordingly, the computing entity 300 may carry out the functionality as logical operations and these logical operations may be implemented (1) as a sequence of computer implemented acts or one or more program modules running on the computing entity and/or (2) as interconnected machine logic circuits or circuit modules within the computing entity. The implementation is a matter of choice dependent on the performance and other requirements of the computing entity 300. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Exemplary Model Development According to Various Embodiments

As previously mentioned, various embodiments of the disclosure involve applying machine learning (ML) models to PSRR data collected on LDOs to classify chips such as ICs and SoCs as either recycled or new. Further detail on the development of these models according to various embodiments is provided below.

Overview of Machine Learning Models Used in Various Embodiments

As discussed further herein, various embodiments may employ different modeling such as, for example, k-nearest neighbor (KNN) clustering for ML model developed using supervised machine learning and variational Bayesian state space model, k-means clustering for ML models developed using unsupervised machine learning. Accordingly, the PSRR for an LDO for a component (e.g., an IC or SoC) that is considered as "suspect" may be measured and any one ML model or combination thereof may be used to detect whether it is recycled (aged) or new. Those of ordinary skill in the art can envision various types of modeling that may be used in light of this disclosure.

In addition, the LDO output pin that is often accessible allows for measuring the PSRR of the LDO in various embodiments. For instance, in most LDOs, the output node is connected to a capacitor to ensure stability. The specification sheets for many industrial LDOs often mention that the minimum capacitor load is attached to the LDO output to stabilize its operation. Thus, reverse engineering the LDO output pin can often be used in, for example, an SoC or printed circuit board (PCB).

Furthermore, commercial off-the-shelf (COTS) LDO chips from various vendors can be used during training and testing in various embodiments to verify the ML models. This can allow for the development of models that are applicable across vendors without any requirement of additional design or logic added to the system. Further, various embodiments may use artificial aging of the LDOs by thermal heating at elevated temperatures to create synthetic recycled counterfeit LDOs due to the unavailability of recycled LDOs.

Finally, in various embodiments, the ML models may be validated on standalone LDOs for simplicity and aging degradation of an LDO may be analyzed with respect to a generic LDO design. The internal designs of LDOs are often proprietary to individual design houses. However, as discussed further herein, general principles can apply to most LDO designs. Accordingly, the trained ML models in various embodiments may be applicable to many ICs/PCBs/SoCs that include an LDO whether they are AMS or digital.

Development of Machine Learning Models for Detecting Recycled ICs

Figure 4:
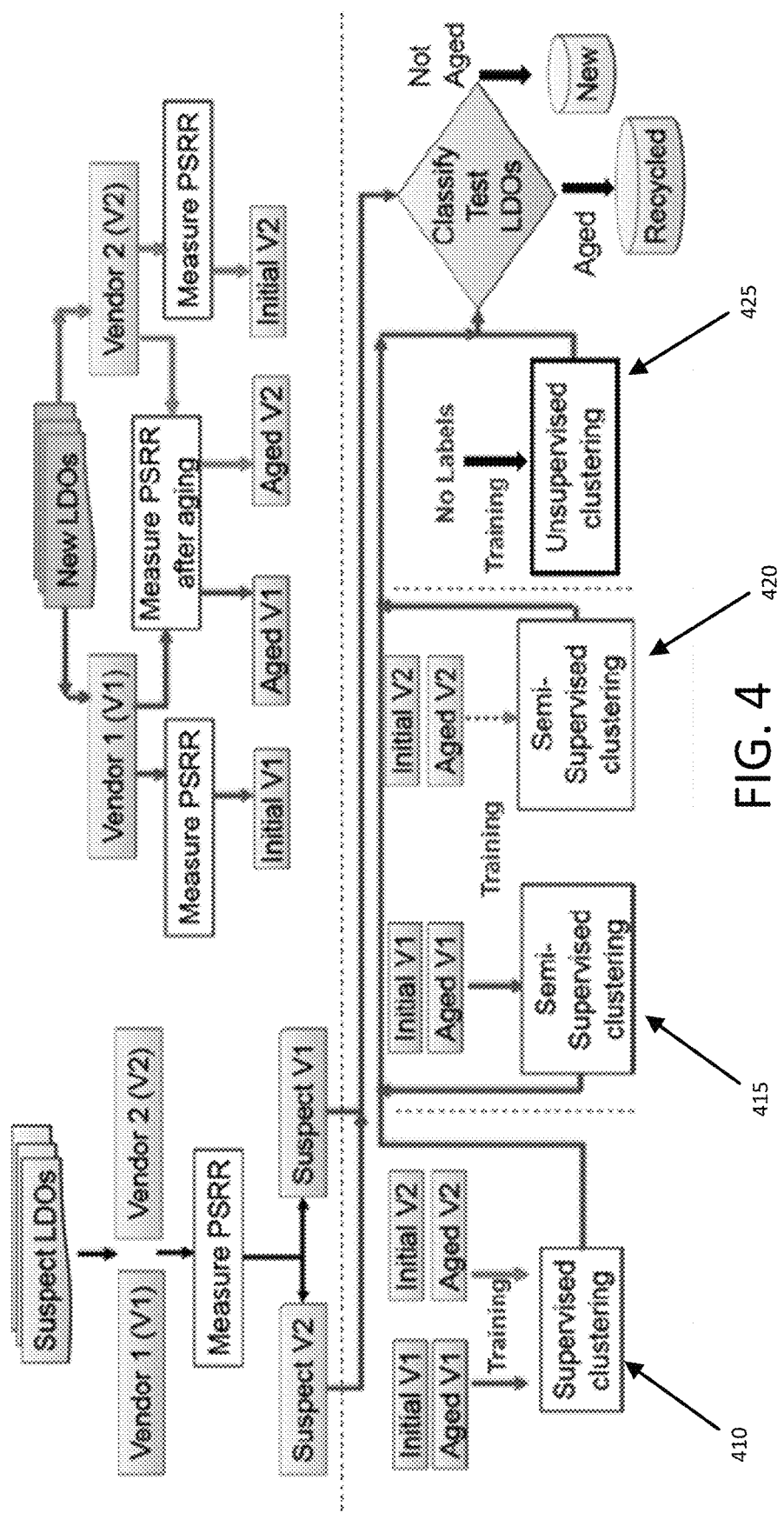
FIG. 4 illustrates a flowchart of operations performed in training one or more machine learning (ML) models using standalone LDOs to detect recycled ICs in accordance with various embodiments of the disclosure.

According to various embodiments of the present disclosure, trained machine learning (ML) models are utilized to detect recycled ICs (e.g., analog/mixed signal (AMS) ICs) by exploiting the aging degradation of the PSRR of LDOs found in ICs. FIG. 4 illustrates a flowchart of operations performed in various embodiments in training one or more machine learning (ML) models using standalone LDOs. These trained models may then be used in recycled IC detection. It will be appreciated that, while the present operations may be performed with respect to any number of vendors, only two vendors are depicted in FIG. 4 for simplicity.

Accordingly, in various embodiments, the ML models 410, 415, 420, 425 are trained using input data (PSRR data) from LDOs. Here, in particular embodiments, the input features (PSRR from new and/or aged LDOs from multiple vendors) may vary based on the type of ML training used (e.g., supervised, unsupervised, or semi-supervised). For example, in some embodiments, the training and testing datasets for a supervised ML model 410 may both belong to different samples from the same vendor. While a semi-supervised ML models 415, 420 in some embodiments may be trained with a training dataset from one vendor and a testing dataset from another vendor. For example, these models 415, 420 may be trained with samples from a first vendor V1 and tested with samples from different vendors V2, V3, and V4. In particular instances, this same pattern may be repeated for all the other vendors. With respect to an unsupervised model 425, in some embodiments, trained can be performed on a dataset with no labels. Those of ordinary skill in the art can envision other training processes that may be utilized in light of this disclosure.

Development of Machine Learning Models for Detecting Recycled SoCs

Figure 5:
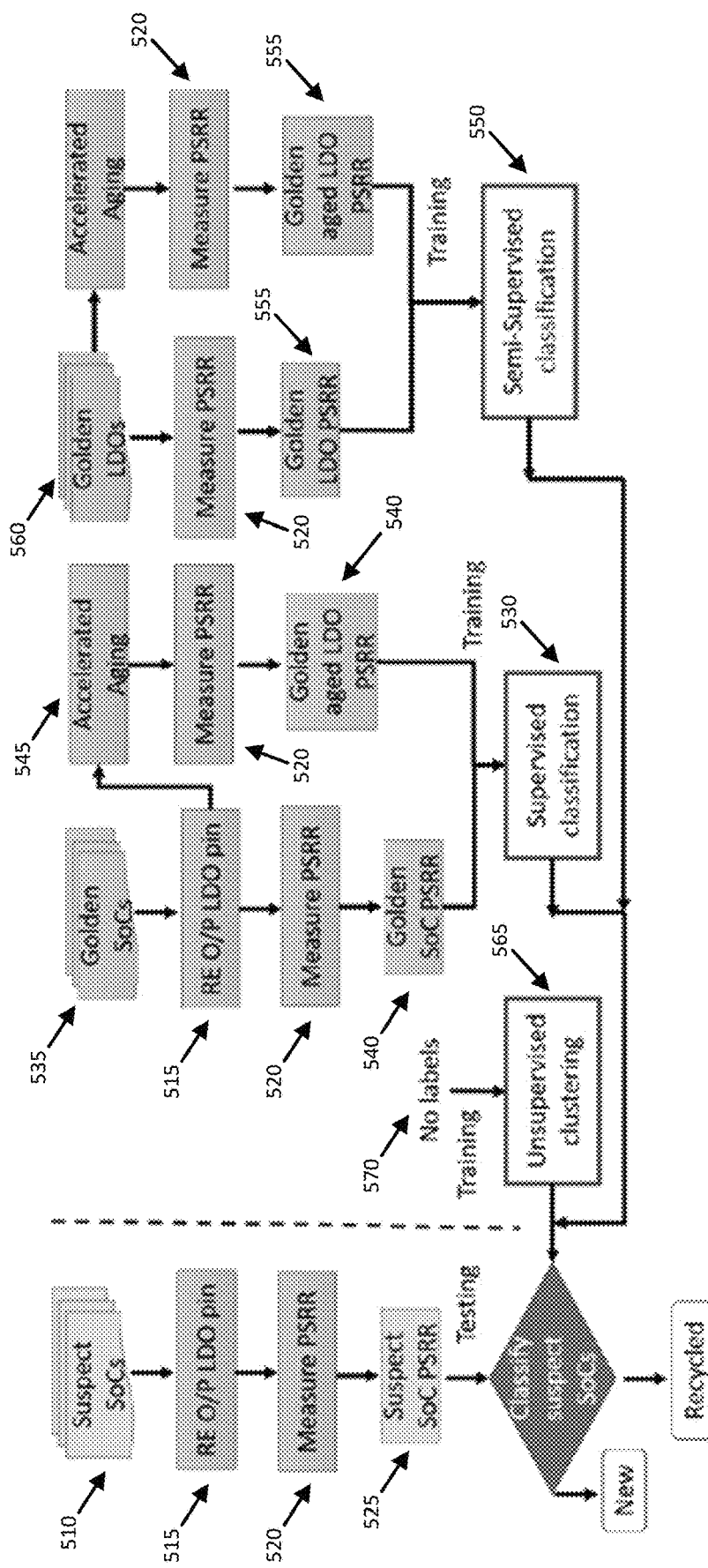
FIG. 5 illustrates a flowchart of operations performed in various embodiments in training one or more machine learning (ML) models used for detecting recycled SoCs in accordance with various embodiments of the disclosure.

Various embodiments of the present disclosure may also be applicable with respect to detecting recycled SoCs. There are advantages of the application of various embodiments in detecting recycled SoCs. For instance, particular embodiments do not require any enrollment tests or other non-volatile storage requirements. In addition, the hardware overhead is often minimum, with the only cost of applying various embodiments involves the setup of basic electrical test components that are easily available. The process involved in developing the ML models in various embodiments can be divided into the following steps: 1) identifying the type of SoCs where detection can be implemented; 2) reverse engineering the position of the LDO within the SoC and identifying the output of the LDO to measure PSRR; 3) measuring the PSRR of the LDO embedded within the suspect SoC; 4) identifying the correct set of ML models to classify the SoCs as recycled or new; and 5) identifying the correct ML algorithms to develop the ML models. FIG. 5 illustrates a flowchart of operations performed in various embodiments in training one or more machine learning (ML) models used for detecting recycled SoCs. Each of the steps of the development process used in various embodiments is discussed further below.

Identifying Type of SoCs

Various embodiments of the disclosure rely the presence of linear regulators or LDOs within the power supply architecture of the SoC. With that said, most state-of-art SoCs include LDOs since most SoC power converters use LDOs for on-chip integration due to low area requirements. Accordingly, particular embodiments are used for SoCs that include embedded LDOs with output capacitors to allow for simple reverse engineering of the LDO output pin. A typical LDO normally requires an external capacitor for better transient operation, improved PSRR, and stability of the LDO.

There are LDOs that eliminate external capacitors to save area and extra pin-outs known as capacitor-less or cap-less. However, cap-less implementations often undermine LDO performance and result in poor PSRR performance and lesser stability. As a result, cap-less LDOs include severe limitations preventing them from usage in many practical applications like SoCs. Several architectures of cap-less LDOs may provide acceptable performance but only for a single parameter like line regulation, load regulation, settling time, etc. rather than multiple parameters. Most of these LDOs can only load control for a narrow range of load capacitance (1 pF to 100 pF) and fail to provide regulation at higher load currents ($\approx$100 mA, which is typical for commercial LDOs with cap). Cap-less LDOs also suffer from lower performance in terms of PSRR and dynamic performance. Thus, due to the performance restrictions of cap-less LDOs, most SoCs still use LDO architectures with output capacitors where the LDO output pin can be easily reverse-engineered, and various embodiments of the disclosure can be applied.

Reverse Engineering Output Pin of LDOs

In various embodiments, detection 515 of the output pin for embedded LDOs with an output capacitor is accomplished using the specification sheet. Most SoCs containing LDOs with output capacitors contain a dedicated output pin for the external capacitor of the LDO that can be chosen within the specified limits mentioned in the specification sheet. Therefore, since the capacitor is attached to the output node of a generic LDO, this pin-out can be used in various embodiments as the output of the LDO.

Measuring PSRR of LDOs Embedded in Suspect SoCs

As previously noted, the PSRR of the LDO embedded within suspect SoC is measured 520 in various embodiments to identify the SoC as recycled (counterfeit) or new (genuine). Accordingly, in particular embodiments, the output pin of the LDO and the $V_{DD}$ supply pin is identified from reverse engineering 515. A small noise signal is coupled to the $V_{DD}$ pin, and the corresponding power spectrum at the LDO output is recorded. The PSRR is calculated by subtracting the input noise spectrum (in dB) from the output power spectrum (also in dB). Sample PSRR data 525 from suspect SoCs 510 containing LDOs may be recorded and used as input in particular embodiments in testing the ML models for automated detection.

Identifying Correct Set of Machine Learning Models

As previously noted, various types of ML models can be used in various embodiments to detect recycled SoCs. For instance, three different types of ML models that can be used to detect a suspect SoC depending on the embodiment may include a supervised ML model 530, a semi-supervised ML model 550, and an unsupervised ML model 565. In particular embodiments, the training of a supervised ML model 530 requires golden data 535 of authentic samples of the suspect SoC 510. Thus, the training for this ML model 530 is executed with PSRR data 540 from genuine new and aged samples. As discussed further herein, the aged samples may be produced, depending on the embodiment, from accelerated aging 545 of SoC/IC samples to represent synthetic recycled samples or from real-time aging of SoC/IC samples. Although supervised training can allow for the development of a model 530 with good accuracy, the stringent requirement of golden data 535 may prove as a drawback in some instances. However, with the correct set of golden data 535, a supervised ML model 530 can prove to be extremely beneficial in identifying recycled SoCs in various embodiments.

A semi-supervised ML model 550 may be trained in particular embodiments even if golden data from the specific category of SoC is unavailable. Accordingly, in some embodiments, PSRR data 555 from new and aged samples of other categories of SoC or even other stand-alone COTS LDOs can be used in training the semi-supervised ML model 550 to effectively detect recycled SoCs. Such training can alleviate the stringent requirements of golden data. A semi-supervised ML model 550 can also provide high accuracy in various embodiments, making it a good choice, since it only requires golden data 560 from any other LDO chip belonging a different vendor. However, with that said, an ML model 550 developed using semi-supervised training in some instance may only either detect a new or a recycled SoCs and not both. Thus, using a semi-supervised ML model 550 in particular embodiments can result in the risk of an increased number of false negatives that may limit the applicability of such a model 550 in some instances.

Finally, an unsupervised ML model 565 may be trained in various embodiments that requires no labels 570 for clustering the available PSRR data from suspect samples into new and recycled. Although the requirement of golden data may be completely nullified in training an unsupervised ML model 565, the accuracy of such a model 565 may be comparatively lower than the other ML models 530, 550. Nonetheless, such a model 565 may prove beneficial in cases where no golden data is available.

Identifying Correct ML Algorithms to Develop ML Models

As further detailed herein, various embodiments of the disclosure use algorithms belonging to the family of Gaussian mixture models (GMMs) to develop the ML models 530, 550, 565 used in detecting recycled SoCs. Although those of ordinary skill in the art will recognize that other type of probabilistic modeling may be used in light of this disclosure.

Aging of Standalone LDOs

A discussion is now provided on the use of artificial aging of standalone LDOs in various embodiments that can produce aged LDOs used in training various ML models. Accordingly, data may be collected from a plurality of LDOs (e.g., 128) from a plurality of different vendors (e.g., 4 vendors, 32 LDOs each) using an automated test setup. Accordingly, the LDOs can be aged at an accelerated rate using a temperature (e.g., such as 80° C. in a Summit 12000B automated probe station) and the PSRR data can be collected at time intervals such as, for example, 1 hour intervals for 9 hours. Collecting aging data every hour can enable the determination of the optimum amount of aging required to detect recycled LDOs. Here, temperature acceleration is used in various embodiments because LDOs are designed to operate at a range of input voltages and therefore, have no specific operating voltage. According to literature, the elevated temperature converts to an accelerating factor of 21. Thus, 9 hours of accelerated aging converts to approximately 9 days of constant real time aging.

Figure 6:
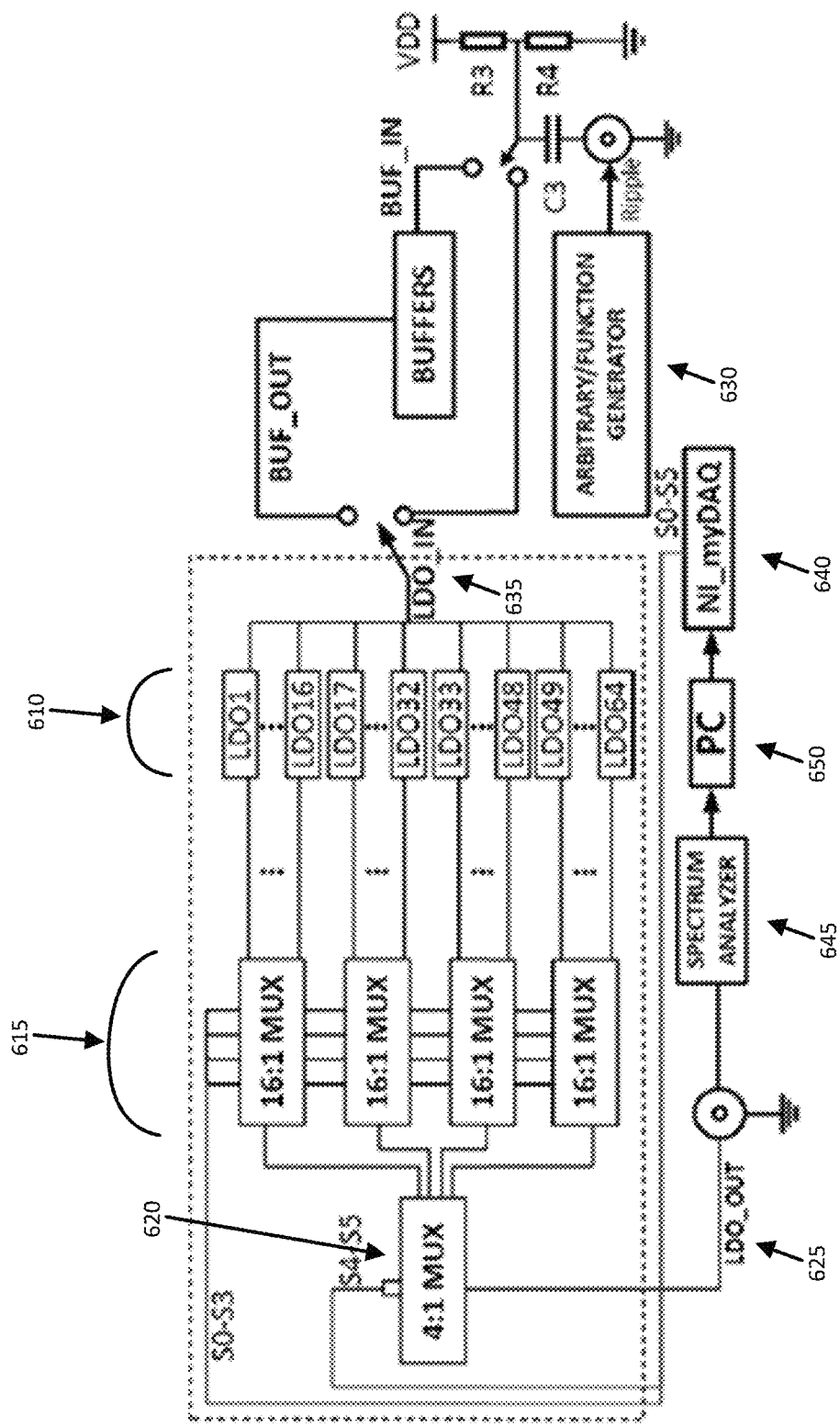
FIG. 6 illustrates a block diagram of an automated test setup that may be used to collect data from a standalone LDO in accordance with various embodiments of the disclosure.
Figure 7A:
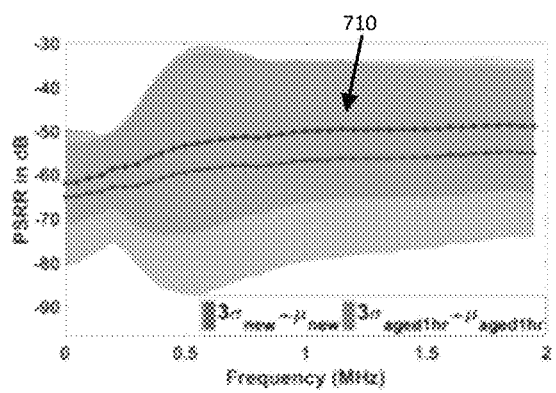
FIGS. 7A-7H illustrate silicon data showing mean PSRR degradation of LDOs for various vendors.
Figure 7B:
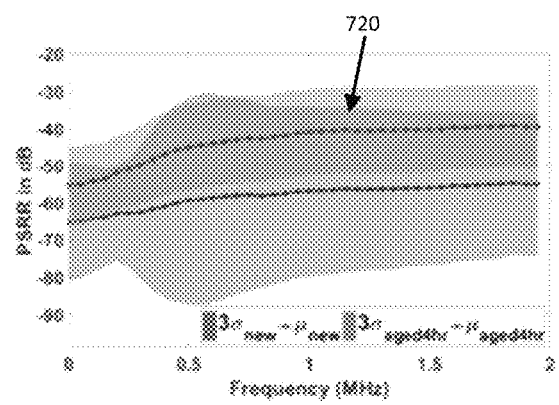
Figure 7C:
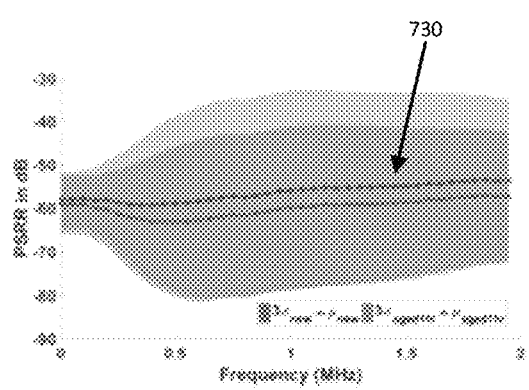
Figure 7D:
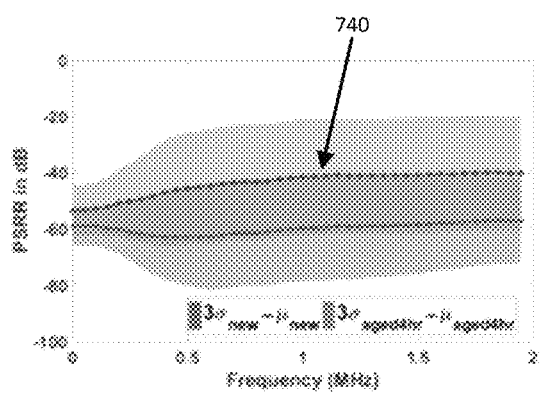
Figure 7E:
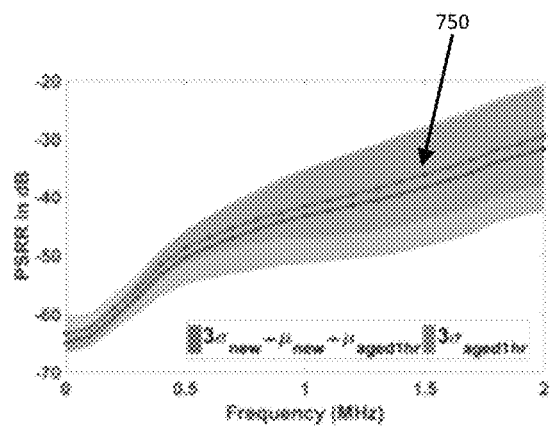
Figure 7F:
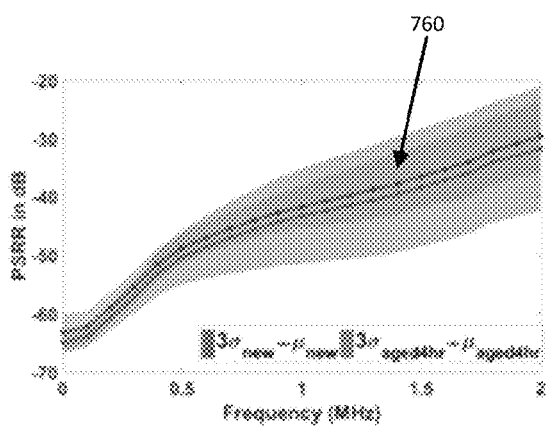
Figure 7G:
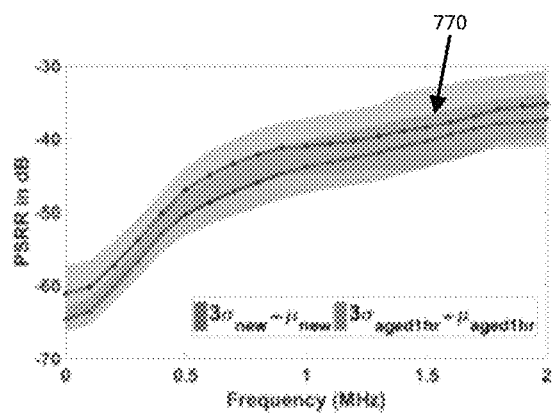
Figure 7H:
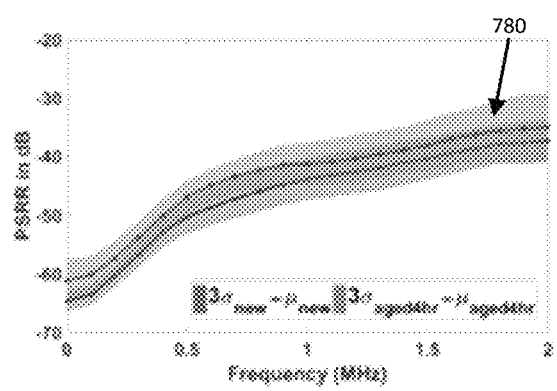

For instance, an automated test setup that can be used for aging LDOs in particular embodiments is shown in FIG. 6. Here, the setup may involve a plurality of LDOs (e.g., 64) 610 from multiple vendors (e.g., 2) on a PCB. The LDOs 610 are multiplexed through four 16 channel multiplexers 615 and one 4 channel multiplexer 620. Accordingly, multiple PCBs can be used to cover LDOs from multiple vendors. For instance, the aging can be carried out using a first PCB (PCB1) having a first plurality of LDOs from a first vendor V1 and a second vendor V2, and a second PCB (PCB2) having a second plurality of LDOs from a third vendor V3 and a fourth vendor V4. The output current 625 of the LDOs 610 can be maintained at approximately 30 mA.

The input pins of the LDOs 610 include the supply voltage, an enable pin, a ground pin, and a feedback pin. There is a single output pin which provides the regulated output. For example, for vendors V1 and V2, the input operating range can be set from 2.7V-10V and 1.8V-20V respectively. An input supply of 7V and 15V can be applied for V1 and V2 respectively. For vendors V3 and V4, an input supply voltage of 3V can be applied, which is approximately the mean voltage of the common operating voltage range (0-5.5V) of the LDOs 610 from the vendors. The voltages can be chosen such that they remain well within the absolute ratings of the LDOs 610 and depict the normal working condition of the LDOs 610.

During the entire accelerated aging procedure, the LDOs 610 are typically running, resulting in the enable pin of each LDO 610 being high. The feedback pin of each LDO 610 is connected to a resistor divider, in which the resistors can be chosen using a product data sheet. The output pin of each LDO 610 is connected to a capacitor (e.g., 4.7 uF for V1, V3 and V4 and 1uF for V2) according to the respective product data sheet to stabilize the LDO operation. The output pin of each LDO 610 can also be attached to a load resistor whose value is chosen to maintain an output current such as, for example, 30 mA. In this example, 32 LDOs 610 from each vendor can be running simultaneously during aging, thus eliminating the possibility of exceeding 30 mA when taking into consideration the maximum current limit of the power supply and buffers. The LDOs 610 can be aged at 80° C., which is one of the standards for reliability testing.

A noise signal (e.g., of 500 mV(p-p)) using an arbitrary function generator 630 can be generated and coupled to the power supply $V_{dd}$ with a capacitor. For example, the noise signal can be chosen such that: $Vac_{max}+Vdc<V_{ABS}$ (max) of the LDO 610 and $Vdc-Vac>V_{UVLO}$ of the LDO 610. UVLO or the undervoltage-lockout of an LDO 610 is an electronic circuit used to turn off the power when the input voltage drops below the operating value of the LDO 610. This means that when the AC signal noise is applied, the voltage input needs to remain in the operating range of the LDO 610. The noise signal is passed through a buffer and is applied at the input 635 of the LDOs 610. The select lines of the multiplexers can be applied using, for example, National Instruments (NI) myDAQ 640 and the output 625 of the LDO 610 is connected to a spectrum analyzer 645 to measure the power spectrum. A program such as MATLAB from a PC 650 can be used to apply select signal(s) to the NI myDAQ 640 and collect the output from the spectrum analyzer 645 serially. Based on the measured power spectrum, PSRR curves can be generated for each LDO 610 across a range of frequency, such as, for example, from 1 Hz to 2 MHz at intervals of 5 KHz.

The silicon data depicting transistor aging effect on PSRR of 128 different LDOs from 4 different vendors (32 LDOs for each vendor) is shown in FIGS. 7A-7H and FIGS. 8A and 8B. The PSRR (in dB) is shown as negative as it implies suppression of output ripples. The more the absolute value of PSRR (i.e., |PSRR|), the better the suppression. As can be seen in FIGS. 7A-7H, the value of |PSRR| 710, 720, 730, 740, 750, 760, 770, 780 degrades with aging for all of the vendors. The frequency range 1 Hz-500 KHz refers to the lower frequency range where the PSRR is actively controlled by the loop gain of the LDO as previously explained. With 1 hour of accelerated aging at 80° C., the mean PSRR degrades for LDOs from both vendors V1 and V2 but it is difficult to discern because of the process variation (shown by shaded regions) in between the LDOs. However, when the time of accelerated aging increases to 4 hours, the mean PSRR degrades with aging and the separation between becomes easily distinguishable. Due to the wide process variation in between chips (considering 3σ variation shown by shaded region in FIGS. 7A-7H), the aged PSRR distribution still overlaps with the new one. But the new and aged PSRR distributions are completely separable considering 1σ process variation (applicable to V1 and V2 after 4 hours of accelerated aging and to V3 and V4 after 2 hours of accelerated aging).

For the LDOs from vendors V3 and V4, the PSRR also degrades after 1 hour of accelerated aging, but unlike the LDOs from vendors V1 and V2, the PSRR degradation for the LDOs from vendors V3 and V4 saturates after 1-1.5 hours of aging. After that, for LDOs from vendor V3, small shifts are seen in mean PSRR until 3 hours of accelerated aging 810 as shown in FIG. 8A. For LDOs from vendor V4, with increased accelerated aging, certain undulations on the PSRR curve increase until 15 hours of accelerated aging 815 as in FIG. 8B. It can be seen that the curves increase from 4 hours through 15 hours of accelerated aging, whereas the mean PSRR degradation has already saturated after 4 hours. This can be due to shifting of intrinsic capacitances of the pass transistor which may shift the dominant ($\omega_o$) as well as the non-dominant poles ($\omega_a$). Also, at higher frequencies, the gate to drain and gate to source capacitance of the PT may behave as a short circuit and can directly couple the $V_{dd}$ noise to the gate of the PT and the output of the LDO, resulting in degraded PSRR at the output. It is also interesting to note that the process variation (3sigma) in between PSRRs decreases with the aging of the chips which is evident for all the vendors V1 through V4 in FIGS. 7A-7H.

The difference in the aging behavior among the LDOs from vendors V1, V2, V3 and V4 may be attributed to the inherent differences in the design of the LDO including the technology nodes applicable to each of them. The input voltage range for the LDOs from vendors V1 and V2 is approximately 0-5.5V, while the input voltage range for LDOs from vendors V3 and V4 is 0-20V. The output current range for LDOs from all of the vendors is from 10 mA to 100 mA. For similarity of test conditions and to limit power consumption for each PCB, a common input voltage range (0-5.5V) can be used among all the vendors and a mean input (3V) can be applied. However, the LDOs from vendors V3 and V4 can operate at higher voltage ranges in this instance, therefore the degradation can be different for LDOs from vendors V3 and V4 compared to LDOs from vendors V1 and V2. Irrespective of the aging behavior, the degradation is prevalent in LDOs from all of the vendors and in all cases the degradation is shown to be maximum at initial hours of aging and saturates after a given aging time.

Aging of LDOs in SoCs

In various embodiments, the entire test setup for standalone LDO PSRR measurement is typically straight forward to automate since most LDOs have similar characteristics, it is easier to obtain multiple vendors producing LDOs with similar footprints and related specifications. Whereas SoCs are generally very different from one another, and thus measuring PSRR from each type of SoC cannot typically be automated as easily. Compared to stand-alone LDOs, SoCs containing LDOs are much more expensive. Thus, the increased cost, lack of automation, and increased time for PSRR measurements can serve as a bigger challenge. In addition, the increase in cost and the required time, limited the total number of samples that typically can be tested. Even allowing more time, the heterogeneous property of SoCs requires different test benches for different vendors and types of SoCs, which also limited the number of samples that can be tested. Finally, recycled IC detection only targets individual ICs in various embodiments, making output pins easily available. However, for recycled SoCs, the output of LDOs needs to be reverse engineered in many instances, thus requiring more time and effort than individual ICs.

Although the number of samples recorded can be less for SoCs due to increased cost and time requirements, the use of semi-supervised and unsupervised ML models in particular embodiments can reduce the requirement of a large number of golden samples. No labels are typically required in training an unsupervised ML model, which can completely negate the requirement of golden data. However, this may come at the cost of detection accuracy. For a semi-supervised detection model used in detecting recycled SoCs, the entire training in particular embodiments is done with previously recorded PSRR data from COTS stand-alone LDOs, which can be easily automated and obtained at a comparatively lower price. Since recycled samples can be unavailable in the market for inspection, various embodiments of disclosure involve using an accelerated aging process to produce a synthetic recycled counterfeit version of the corresponding samples of SoCs.

Accordingly, the following accelerated aging process may be used in various embodiments to produce synthetic recycled counterfeit versions of SoCs. At first, initial PSRR data may be obtained from the LDO embedded within an SoC. As an example, a Delta-Sigma ADC containing an embedded LDO may be used as a sample SoC and initial PSRR from four such ADC SoC samples may be obtained that constitute the set of the PSRR data for new SoCs. For instance, in this example, an automated test setup may include a 2-channel 24-bit delta-sigma ADC SoC that is connected to a function generator and a power supply to turn on. Here, a SoC evaluation board with a software portal can be used to record the digitally encoded signal of the analog input signal provided to the SoC as the SoC is constantly made to run through scripts from the software portal. Such an automated setup that can be utilized in various embodiments is shown in FIG. 9.

In particular embodiments, the initial task is to reverse-engineer the output port of the LDO located within the SoC 910. Returning to the example, since this type of SoC 910 mainly uses LDOs with output capacitors for precise performance and specifications, reverse engineering the LDO's output pin in many instances can be performed. The LDO output is provided as one of the pin-outs of the SoC 910, which provides access to the PSRR of the LDO. In order to record the PSRR, a tracking spectrum analyzer 915 can be used to generate an output noise signal such as magnitude 1 dBm, and it can be coupled to the $V_{DD}$ of the SoC 910 using a summing amplifier 920. The input power spectrum at the $V_{DD}$ and the output power spectrum at the LDO output can be recorded. The input power spectrum can then be subtracted from the output, providing the initial PSRR of the LDO embedded within the SoC 910. After the initial PSRR data is recorded from the SoC 910, the process can continue with the accelerated aging of the SoC 910.

Here, in particular embodiments, the accelerated aging is executed at a high temperature such as 105° C. for a plurality of consecutive hours (e.g., 8 hours) while the SoC 910 is active, and PSRR data is recorded periodically such as every hour. Accordingly, this recorded PSRR data can serve as the PSRR dataset for the recycled SoC 910. The temperature can be increased using a thermo-stream 925 maintaining the SoC 910 at the high temperature (e.g., e 105° C.) for the plurality of consecutive hours. During this time, the SoC 910 can be allowed to continuously operate and the PSRR data can be collected periodically (e.g., every hour) to determine the degradation of PSRR across time. Accordingly, the collection of the PSRR data can be performed in a similar fashion as to the collection of the initial PSRR data. As previously discussed, the HCI and BTI effect on the transistor during accelerated aging degrades the performance and other specifications for the transistor such as threshold voltage ($v_{th}$), transconductance ($g_m$), etc. (see Equations (1)-(4)). The PSRR data generated from the accelerated aging of the LDO comprises the dataset of recycled SoCs' PSRR responses.

Accordingly, the aging response found in LDOs embedded in SoCs is similar in certain aspects to the aging response found in standalone LDOs, yet dissimilar in other aspects. Compared to stand-alone LDOs, as shown in FIGS. 7A-7H, the amount of noise is more in the SoC, as shown in FIGS. 10A and 10B, due to the increased number of modules and other switching activities occurring within the SoC. The spikes 1010, 1015, 1020, 1025 appearing in FIGS. 10A and 10B provide proof of the variance that appears across certain frequencies in the distribution. The variance increased much more between 1-1.5 MHz and 2-2.5 MHz for the PSRR in case of SoCs. But for stand-alone LDOs, the variance is almost similar across the frequency range with no sudden spikes appearing. This kind of variance can likely be attributed to the process variation among the ICs and not due to frequency dependent noise. Apart from that, the initial degradation is more for stand-alone LDOs as can be seen with the maximum degradation occurring within the first two-four hours of the accelerated aging as shown in FIG. 8B.

For SoCs, the PSRR degrading 1030 is found to be consistent across eight hours, as can be seen in FIG. 10C. Although this may be difficult to explain without understanding the inherent design of the SoC and may vary from one SoC to another, apart from the LDOs, other components may degrade within the SoC, affecting the PSRR degradation of the embedded LDO. There is also other consistent changes in the PSRR degradation across time, which is not that prominent for stand-alone LDOs. As can be seen in FIG. 10C, the peak 1035 at approximately 1.2 MHz consistently shifted towards right across aging time for all the SoC samples. This can be because of sudden changes in the parasitics due to the effects of aging, which is a striking feature of SoCs that is not evident from stand-alone LDOs. For stand-alone LDOs, though there were bumps on the PSRR due to accelerated aging as seen in FIG. 8B, the effect is not that consistent across aging hours as seen in SoCs.

Despite the dissimilarities mentioned above, the inherent aging principle is still similar for both stand-alone and embedded LDOs. As can be seen in FIGS. 7A-7H, 10A, and 10B, the difference between the mean of new ($\mu_{new}$) and aged ($\mu_{aged}$) PSRR distribution increases with the increase in aging hours for both stand-alone LDOs and LDOs embedded in SoCs. It can be seen that the mean difference, $\mu_{new}$-$\mu_{aged}$ for SoCs had an average of approximately 1.5 dB across frequency for four hours of aging, while it was approximately 0.14 dB across frequency for one hour of aging (refer FIGS. 10A and 10B). For stand-alone LDOs, the difference in the mean PSRR across aging can be seen in FIGS. 7A-7H. While this difference is higher for certain vendors like V1, V2, etc. it is comparatively smaller for many vendors like V3, V4, etc. Also, the DC PSRR shifted in LDOs embedded in SoC, like the stand-alone LDOs, follows the same principle of aging phenomena as described in equation (5). Thus it may be concluded that the initial PSRR may be different for each of the above cases, but the difference obtained between the initial PSRR and the resultant PSRR after aging bore similarities in both the cases. In other words, the trend of aging degradation is similar across aging hours, which can be modeled in various embodiments by ML algorithms.

As detailed further herein, the above similarities in the aging trends has led to a second type of semi-supervised training in some embodiments. Specifically, the difference between a new and an aged PSRR is used to train and test the models. Such embodiments originates from the identical aging trends of stand-alone LDOs and LDOs within SoCs, which can be manifested in the difference of new and aged PSRRs of both LDOs and SoCs. In other words, although the initial PSRR or the aged PSRR values of a stand-alone LDO may vary from that of an LDO within an SoC, the difference between the initial and aged PSRR is similar due to the similar physical aging phenomenon that impacts both the structures.

Applicability of Gaussian Mixture Models

As one of the key steps for machine learning (ML) in many instances is data representation, an explanation of how the collected PSRR data can be prepared in various embodiments to feed into an ML model is provided. Here, the dataset is multidimensional and collected over pre-defined time and frequency ranges. For example, for an LDO and at given frequency, the PSRR measurements can be performed in particular embodiments at predetermined intervals over a time window such as, for example, every hour over a 9-hour time window. Thus, the sequence of the measured values can be represented as a time series over this dimension (i.e., time). When the dataset is examined over the other dimension (i.e., frequency), it can be observed that the sequence of the measured PSRRs is ordered and exhibits irregularities (e.g., environmental noise). In other words, this sequence exhibits the characteristics of a time series, although being non-temporal naturally.

Therefore, the problem of classifying and/or clustering the data collected from LDOs over a range of frequency can be thought of as a sequence labeling problem, where the sequences are non-temporal, but time series-like. Accordingly, such a problem can be tackled in machine learning by applying a time-series analysis adapted to reflect the non-temporal nature of the data. A common approach that can be used to analyze a sequential, structured, time series-like data is to employ a state space model (SSM).

In a state space model (SSM), it is assumed that a sequence of measured data y (in a vector form) y1, y2, . . . is generated by some hidden state variables x1, x2, . . . , with joint probability, $$p(x_{1:F}, y_{1:F} \mid \theta) = \prod_{f=1}^{F} p(x_f \mid x_{f-1}, \theta) p(y_f \mid x_f, \theta)$$

where $\theta$ is the model parameter, $x_{1:F}$ and $y_{1:F}$ are the sequence of F sequences of the hidden state variables and the measurements, respectively. Note that the indices f and F represent that the data is collected over a frequency range in an ordered manner. Accordingly, various embodiments of the present disclosure make use of one type of SSMs known as linear-Gaussian state space models composed of multivariate Gaussian-distributed variables with a linear relationship, as formulated in Equation (5). It can be appreciated by those of ordinary skill in the art that other SSMs are applicable without departing from the scope of the present disclosure.

$$y_f = C x_f + v_f$$

$$x_f = A x_{f-1} + w_f \quad (5)$$

The linear relationship is shown through C and A matrices, and the vectors v and w represent uncertainty. These two vectors also follow Gaussian distributions, with covariance matrices R and Q, respectively. In the context of the problem, $\theta = (A, C, Q, R)$ are the parameters of an LDO. The vectors v and w account for the total impact of aging, environmental noise, uncertainty imposed by the measurement process, etc. While the former requires more elaboration, it is common to assume a Gaussian distribution for the latter ones. To this end, it is emphasized that for the machine learning approaches used herein for various embodiments, instead of a gate-level characterization of aging, it suffices to model the impact of aging as an uncertainty—represented by a Gaussian variable.

Markov Assumption

Another important aspect of the linear Gaussian SSMs described herein is the dependency of the hidden state variables $x_f$ on one another, or in other words, the characteristics of first-order Markov dynamics. In practice, this variable can be related to the physical characteristics of an LDO. However, for particular embodiments, the frequency from which the PSRR values begin to be measured is adopted. This choice is very natural since it is known that if the PSRR value is measured at a given frequency, i.e., $f_i$, and then switched to the frequency $f_i+1$, the value of the PSRR measured at this frequency depends heavily on the frequency $f_i$. This holds according to the transfer function of PSRR in Equation (1), where, PSRR (see, e.g., FIG. 1) degrades as a function of the initial LG. The PSRR is dependent on the LG. The component LG varies for frequency but can be depicted as a fraction of the LG at DC. Thus, if the PSRR is recorded over two successive frequency points, say $f_i$ and $f_{i+1}$, then the PSRR at frequency $f_{i+}1$ is dependent on the PSRR at the previous frequency $f_i$.

Parameter Optimization

Various embodiments are configured to use expectation-maximization (EM) to learn the parameters of the linear Gaussian SSM defined above. Informally, this algorithm first fits some arbitrary density function over the hidden variables for a fixed model parameter (i.e., the step "E"), and then in the next step, "M", the model parameter is again estimated by maximizing the likelihood. Similar to other maximum likelihood approaches, the EM algorithm may fail to determine the best model size and structure due to the complexity of the model. To address this issue, variational Bayesian inference is performed in particular embodiments over the parameters of probabilistic models in conjunction with the EM algorithm. This type of approximation is helpful to face two major obstacles. First, Bayesian approaches enable guessing of some prior distribution over the space of parameters $p(\theta)$ and improving step-by-step, when analyzing the data. However, this can be computationally heavy while all of the so-called model uncertainties, i.e., all possible model parameters $\theta$ and their respective $p(\theta)$, should be considered. The second contribution of variational Bayesian inference resolves this issue, and consequently, reduces the amount of data required for the learning process.

Thus, due to the complexity of the linear Gaussian SSM caused by the uncertainties imposed by the nature of the data, a combination of variational Bayesian inference and EM algorithm is applied in various embodiments, hereafter referred to as the VB method. It is also important to observe the close relationship between the EM algorithm and the k-means algorithm, widely accepted as a standard approach to cluster data.

With that said, k-means may also be employed in various embodiments to learn the parameters of the linear Gaussian SSM defined above. Given a set of n observations of d dimensional vectors (a1, a2 ... an), the k-means algorithm partitions the set of n observations into k sets (S1, S2, ... Sk) where k<n by minimizing the sum of squares (or variance) within each cluster as shown in equation (8) below, where $\mu_i$ is the mean of the points within the $i^{th}$ set $S_i$:

$$\arg\min_S \sum_{i=1}^{k} \sum_{x \in S_i} \|a - \mu_i\|^2 = \arg\min_S \sum_{i=1}^{k} |S_i|\sigma^2(S_i) \quad (6)$$

Although the k-means algorithm has much in common with the EM algorithm, in particular instances, the k-means algorithm may perform better in terms of accuracy then EM algorithm.

Accordingly, with respect to the applicability of supervised algorithms, the KNN algorithm is applied in various embodiments as one of the closest approaches to the VB and the k-means methods. The rationale behind this approach is that examples exhibiting similar properties should be in close proximity to one another in a dataset. Hence, when an unseen, new sample is given to the algorithm, its label should be similar to the label of its nearest neighbors. In particular embodiments, the k nearest neighbors are determined according to a distance metric (e.g., Euclidean distance), and the new sample is then labeled with the most common label of those k nearest neighbors. To accurately classify new samples, the number of neighbors is vital. Thus, for noisy datasets with complex structures and uncertainties, a high value of k is selected, whereas, for intimately placed data samples, a smaller k needs to be chosen. Nevertheless, when applying the KNN algorithm, the value of k can be automatically chosen by fitting the best classifier to the data.

Training of Models According to Various Embodiments

As previously noted, various embodiments of the present disclosure apply various ML models to PSRR data obtained from ICs and SoCs to determine whether the ICs and SoCs are new (e.g., not counterfeit) or recycled/old (e.g., possibly counterfeit). Accordingly, these ML models may be trained using PSRR data collected from LDOs (e.g., standalone LDOs and/or LDOs embedded in SoCs) across a plurality of vendors.

Accordingly, an ML model may be developed in particular embodiments under supervised training using a training dataset having samples (e.g., standalone LDOs and/or LDOS embedded in SoCs) with labels (e.g., "new," "old") from a single vendor. The core idea behind this type of training is to learn from a subset of samples (new and/or aged) and verify to what extent the trained model can generalize to other samples from the same vendor.

In addition, an ML model may be developed in particular embodiments under semi-supervised training using a training dataset having a subset of samples (e.g., standalone LDOs and/or LDOs embedded in SoCs) produced by a first vendor and then testing the training model on a testing dataset having samples from another (different) vendor. Accordingly, such training can allow the need for golden data (e.g., PSRR from known new LDOs) from only a single vendor.

Further, an ML model may be developed in particular embodiments under unsupervised training using a training dataset having samples (e.g., standalone LDOs and/or LDOs embedded in SoCs) with no labels, although at least one golden sample (new or aged) may be provided to the model. For instance, in some embodiments, an unseen sample and a golden sample may be taken into consideration to determine whether the unseen sample is new or aged. Accordingly, if the samples are identical in age, then solely one cluster would be delivered after the training process. However, if there is a slight difference between their ages, then the model should be able to cluster them by taking one of the LDOs as the new one.

Under this scenario, two possible approaches may be taken depending on the embodiment. In particular embodiments, only the PSRR of the components is measured. Afterward, the measured values are provided as input to the model in a pair-wise manner including both the golden and the suspect samples. Based on the clusters produced by the model, the sample is identified as either new or aged. In other embodiments, the PSRR of the components is measured and repeated after a while, such as after following a synthetic aging (partially destructive) procedure.

Accordingly, the datasets used in training the models may be collected from components manufactured by a plurality of different vendors (e.g., four). For example, components may be selected from a plurality of vendors (e.g., manufacturers) and for each component, PSRR values are measured over a wide frequency range such as 1 Hz to 2 MHz, every 5 kHz. Accordingly, the frequency range may be chosen based on the greatest possible separation between the new and aged components (on average) found to be observed for the range.

Data Augmentation

Various embodiments may also employ data augmentation techniques to address the number of available samples for training. Accordingly, in these particular embodiments, data augmentation techniques can be used to improve the diversity of data available for training the ML models. For instance, principal component analysis (PCA) may be used in some embodiments to augment a dataset. PCA is a linear orthogonal transformation of a dataset to a new set of coordinates, where the first coordinate is the greatest variance of the scalar projection of the dataset, the second coordinate is the second greatest variance, and so on. PCA analyzes any dataset and provides n eigenvalues to represent the principal components of the dataset. Out of those, k values are kept similar to that of the original dataset, whereas the n-k values are replaced and randomly chosen from a Gaussian distribution to represent the augmented dataset. For instance, this type of augmentation can be helpful where the same SoC data is needed with a wider range of process variation than can be obtained from the original dataset of SoCs.

For example, a set of forty-eight augmented PSRR dataset can be derived from four original components. Here, a dataset of PSRR from a specific SoC of a particular vendor can be augmented and eigenvalues with the higher variance can be taken as the intrinsic aging property, which would remain similar for all the SoCs. Since the dataset has the PSRR data for each time interval (e.g., each hour) of aging across a range of frequency points (e.g., a range of 600 frequency points, each separated by 5 KHz), the total number of features can be large enough for PCA analysis. To prevent information loss, the lesser varying eigenvalues can be randomly altered to reflect the changes that can occur due to process variations. Since the entire dataset represents the same unit (e.g., dB vs. MHz), there is no requirement of data standardization as is typically required for applying PCA analysis. The distribution of augmented data 1100 of forty-eight SoCs obtained from using PCA to the original four SoCs can be seen in FIGS. 11A and 11B. It can be seen that it is similar to the distribution obtained for the original four SoCs, as seen in FIGS. 10A and 10B. In some instances, the original data from the four SoCs and the augmented data from the forty-eight SoCs may be combined to generate a final dataset of fifty-two SoCs that can be used for SoC recycled detection ML analysis.

Exercise in Supervised and Semi-Supervised Training of ML Models for Standalone LDOs An exercise was conducted using supervised and semi-supervised training in accordance with various embodiments to develop ML models that can be used in detecting recycled components based on PSRR data from standalone LDOs. In the exercise, the labels (i.e., "new," "old") of the standalone LDOs were provided to the ML models under supervised and semi-supervised training. Here, k was chosen by fitting the best classifier to the data automatically (e.g., k was set to 5 by the algorithm as the best possible parameter). The results of the exercise are now discussed.

The results for detecting new and aged LDOs using ML models employing a KNN algorithm can be seen in FIGS. 12 and 13, respectively. Specifically, FIG. 12 illustrates results of detecting new LDOs from each of a first, second, third, and fourth vendor (V1 1210, V2 1215, V3 1220, and V4 1225) over hours of aging by applying KNN classifiers to the dataset. FIG. 13 illustrates results of detecting aged LDOs from each of the first, second, third, and fourth vendors (V1 1310, V2 1315, V3 1320, and V4 1325) over hours of aging by applying KNN classifiers to the dataset. A 10-fold cross-validation process was used to assess the accuracy of the classification for both groups of new and aged LDOs and the average and the standard deviation (over the set of LDOs from each vendor) of the accuracy are reported. In other words, the results illustrated in FIGS. 12 and 13 are obtained after running the algorithm ten times. In each round, the algorithm was trained on nine folds (i.e., portions) of the dataset and tested on the remaining fold. Doing so assured that the unseen folds were chosen uniformly, and the accuracy of the label prediction is computed in a fair manner, i.e., exhibiting less bias. The results convey that a classification model extracted for a given LDO from each vendor can be used to classify the other LDOs from the same vendor, with a sufficient level of accuracy of up to 97%.

Turning now to FIGS. 14 and 15, these figures illustrate results of models detecting new and aged LDOs that were trained using semi-supervised machine learning. For FIG. 14, training was conducted on a dataset for a first vendor (V1) and testing was conducted on datasets for all other vendors (V2 1410, V3 1415, and V4 1420). For FIG. 15, training was conducted on a dataset for the third vendor (V3) and testing was conducted on datasets for all other vendors (V1 1510, V2 1515, and V4 1520). The results shown in FIGS. 14 and 15 provide an answer as to whether the above generalization is possible for one vendor to another (i.e., that a classification model extracted for a given LDO from each vendor can be used to classify the other LDOs from the same vendor with a sufficient level of accuracy). Accordingly, the classifiers were extracted from the datasets containing data collected from new and aged (aged for one hour, four hours, and nine hours) LDOs from a vendor. These classifiers were further used to categorize unseen LDOs from the other vendors. For a given set of LDOs, new (the hours of aging equal zero) or aged, the average and standard deviation over the set is computed and plotted in FIGS. 14 and 15.

As can be seen in FIGS. 14 and 15, if the average is taken over the age of the suspect LDOs, the classifiers extracted from the data based on LDOs from the first vendor V1 can distinguish whether an LDO manufactured by the other vendors V2, V3, or V4 is new or aged, with the probability up to 71.31%, 79.72%, 82.29%, respectively. Following the same procedure, if the classifier is extracted from the data based on LDOs from the third vendor V3 is examined on the LDOs from the other vendors V1, V2, or V4, the accuracy is up to 92.18%, 93.56%, and 85.88%, respectively. This process was repeated on all possible combinations of vendors, i.e., extracting a classifier from LDOs made by vendor Vi ($1 \leq i \leq 4$) and testing that on LDOs from Vj ($i \neq j$), and the minimum average accuracy found over the age of the suspect LDOs is 69.27%. Accordingly, the results demonstrate that implementing this strategy is feasible, when an aged LDO and a new one from the same vendor are available.

Exercise in Supervised Training of Models for LDOs Embedded in SoCs

An exercise was conducted using supervised training in accordance with various embodiments to develop ML models that can be used in detecting recycled components based on PSRR data from LDOs embedded in SoCs. In the exercise, the labels of PSRR data from a small set of the SoCs, including new and aged ones, was provided to the ML model under supervised learning. Again, k was chosen by fitting the best classifier to the data automatically (e.g., k was set to 5 by the algorithm as the best possible parameter). The results of the exercise are now discussed.

The results for detecting new and aged SoCs respectively, over hours of aging using ML models employing a KNN algorithm can be seen in FIG. 16. Again, a 10-fold cross-validation process was used to assess the accuracy of the classification and the average is reported along with the standard deviation. The results in FIG. 16 show the average of the accuracy obtained by running the algorithm ten times for ten subsets of the data. In each round, the model was trained over nine parts (subsets, or so-called folds) of the dataset, whereas the testing was conducted on the remaining one part of the dataset. In this way, the training and suspect data were chosen uniformly across the dataset, and there was less bias while computing the accuracy.

The results show that the model extracted from the PSRR of a given set of SoCs can be used to predict the age of the other SoCs up to a maximum accuracy of approximately 90% for new SoCs and approximately 83% for aged/old SoCs. While explaining the results, it can be understood that the average detection accuracy improves with the increase in aging time, as can be seen in FIG. 16. This trend can be seen for the detection accuracy of both the new 1610 and aged (recycled) 1615 SoCs. The reason for such an improvement can be obtained from the disclosure herein pertaining to FIGS. 10A and 10B. As can be seen, the difference between the mean PSRR of the new chip distribution and the mean PSRR of the aged chip distribution ($\mu_{new}$-$\mu$aged) increases with the accelerated aging time. That is to say, it becomes easier for the classifier to distinguish a new chip compared to a recycled one. Thus, as the aging time increases, the new chip PSRR distribution separates from the aged chip PSRR, and the classifier can detect the difference even across the process variation and the measurement noise. For only one hour of accelerated aging, the mean difference between the new and aged PSRR is approximately 0.14 dB which may be mistaken by the classifier as process variation, but with an increase in the difference, which is about 1.5 dB after four hours of aging, the classifier can typically distinguish this difference over process variation. The same trend of detection accuracy is seen for supervised classification for stand-alone LDOs, where the average accuracy increases with the aging hours for a few vendors (V1 and V2). But for other vendors (V3 and V4) of LDOs, the detection accuracy is more or less constant across aging hours since, the degradation of PSRR shown to saturate for these vendors after approximately three hours of accelerated aging. But for the LDOs embedded in the SoCs, a continuous degradation of PSRR can be seen across aging hours till the fifth hour of aging, as shown in FIG. 10C. Thus, the accuracy of detection can saturate after the fifth hour of aging, as seen in FIG. 16.

Exercise in Semi-Supervised Training of Models for LDOs Embedded in SoCs

An exercise was conducted using semi-supervised training in accordance with various embodiments to develop ML models that can be used in detecting recycled components based on PSRR data from LDOs embedded in SoCs. In the exercise, a classification format similar to the supervised classification format used above for LDOs embedded in SoCs exercise was used. The same strategy and algorithm were used with a difference in the training dataset. Specifically, the model was provided with the PSRR recorded (new and/or aged) from stand-alone LDOs collected beforehand. The model was then provided with unknown PSRR from a current dataset of SoCs for classification as new or recycled. Accordingly, this type of classification can be beneficial in particular instances where the requirement of golden data is relaxed. Also, the fact that measured PSRR data from stand-alone LDOs can be used to classify PSRR data obtained from embedded LDOs in SoC can bolster the detection procedure of recycled SoCs. The results of the exercise are now discussed.

A question considered during this exercise was whether a model constructed for detecting recycled SoCs using supervised classification can be generalized across other stand-alone LDO ICs available commercially. This is an important aspect since, most of the time, golden data required for supervised classification is not available, and it may be easier to procure PSRR data from stand-alone LDOs compared to LDOs embedded in SoCs. Thus, if the supervised ML model can be generalized to train on other stand-alone LDO PSRR data (aged and/or new), then the entire process can be simplified.

For this exercise, the data was recorded hourly after performing aging and used for training the model. In this regard, two approaches in training the model were used. For the first approach, classifiers were initially extracted from datasets containing new and aged (e.g., aged for one hour) samples of stand-alone LDOs of one vendor at a time. For each vendor, the classifier model obtained was then tested to categorize PSRR of embedded LDOs within SoCs. In doing so, the accuracy of training on each vendor was computed to determine how well the classifier model can categorize an SoC as new or aged. FIG. 17 illustrates the classification accuracy of unseen SoCs over hours of aging for both new (aging hour shown as zero) and aged SoCs by applying KNN classifiers to a dataset containing standalone LDOs for four different vendors (V1 1710, V2 1715, V3 1720, and V4 1725). The results show the classifiers obtained can categorize aged (recycled) SoCs correctly up to approximately 97%, 98%, and 92% after training on V1 1710, V2 1715, and V3 1720 respectively. However, the classification accuracy for detecting a new SoC, in this case, is not as high.

Thus, in the exercise, the classifiers' inability to classify a new SoC may be explained due to the initial PSRR data being different. Here, with no aging, the PSRR data obtained from a LDO embedded in a new SoC can be much different than that of a stand-alone LDO. However, the similarities in the aging trend suggests providing the difference in the new and aged PSRR of the samples during both training and testing can improve the detection accuracy of new SoCs.

The second approach of the exercise was an attempt to simultaneously improve the classification accuracy for new and aged SoCs. FIG. 18 illustrates the detecting accuracy of unseen SoCs over hours of aging by KNN classifiers to a dataset containing stand-alone LDOs of four different vendors (V1 1810, V2 1815, V3 1820, and V4 1825). In the training phase, the ML model was given a dataset composed of the differences between the initial PSRR values measured from a new and an aged stand-alone LDOs as well as their corresponding measurements collected after one hour of synthetic aging. To classify the SoCs, the trained model was applied to the differences between initial PSRR values and ones collected after one hour of synthetic aging. In this case, the classification accuracy improved significantly (up to 96%) as can be seen in FIG. 18, when the standalone LDOs from V1 1810 is considered. Here, the improved accuracy may have been achieved for V1 1810 due to the fact that V1 1810 is the same manufacturer as that of the SoCs used in the exercise.

Exercise in Unsupervised Training of Models for Standalone LDOs

An exercise was conducted using unsupervised training in accordance with various embodiments to develop ML models that can be used in detecting recycled components based on PSRR data from standalone LDOs. For this exercise, no labels were provided to the ML model during training. The k-means algorithm was applied, as well as the VB method as described herein. In addition, the Silhouette method was applied when using the k-means algorithm to validate the consistency within clusters so as to improve the accuracy of clustering. Furthermore, the replication (i.e., re-sampling) technique was applied to find lower, local minima of the Euclidean distances between samples. Moreover, once the k-means algorithm was run, the centroids the algorithm determined were further used to rerun the algorithm to deal with possible noisy samples. The results of the exercise are now discussed.

FIGS. 19-22 illustrate the results of applying either the k-means or the VB method in two cases. FIG. 19 shows the accuracy obtained detecting new and aged LDOs from a first vendor (V1) using a model trained with initial data 1910, initial data combined with 1-hour aging 1915, and initial data combined with 4-hour aging 1920. FIG. 20 shows the accuracy obtained detecting new and aged LDOs from a second vendor (V2) using a model trained with initial data 2010, initial data combined with 1-hour aging 2015, and initial data combined with 4-hour aging 2020. FIG. 21 shows the accuracy obtained detecting new and aged LDOs from a third vendor (V3) using a model trained with initial data 2110 and initial data combined with 1-hour aging 2115. Finally, FIG. 22 shows the accuracy obtained detecting new and aged LDOs from a fourth vendor (V4) using a model trained with initial data and initial data 2210 combined with 1-hour aging 2215.

In what is referred to herein as Case 1, the PSRR values measured from the golden LDO and the suspect LDO were fed into the model, whereas in what is referred to herein as Case 2, both of these LDOs underwent a synthetic aging procedure for one hour to four hours. The PSRR values corresponding to those hours of artificial aging, along with the initial values measured in Case 1, were then fed into the model. The accuracy of the clustering after each stage of artificial aging is reported. Note that the X-axis shows the minimum age of the LDOs under test. Moreover, by saying initial aging equals zero means a new LDO is involved. Additionally, the accuracy of clustering over the set of LDOs from each vendor is presented as either new or aged. In other words, the curves show how accurately a new component is clustered as new, and similarly how accurately an aged component is clustered as aged.

As can be seen, although the VB method and the k-means models are from the same family of clustering, there is a difference between their results. This may be explained by the fact that the k-means model clusters the data in precisely two clusters, which does not hold for the VB method model that can deliver even one cluster after the learning phase. Moreover, there is a slight difference in the results associated with the four vendors in general.

In addition, the results for including data acquired after one hour or four hours of artificial aging do not vary significantly for LDOs from vendors V3 and V4 (see FIGS. 21 and 22). Therefore, FIGS. 21 and 22 only present the results obtained for the initial data (Case 1) and the initial data with one hour of artificial aging (Case 2). Further, the fluctuations in the results achieved for each case shown in FIGS. 19-22 demonstrate that due to the variation of the impact of aging, the accuracy may not be steadily improved/degraded. As for the difference in the technology used by the vendors, the unsupervised algorithms can perform more effectively in some cases as can be seen in FIG. 22 as an example. Nevertheless, the average maximum accuracy in Case 1 is 74.21% (averaged over all vendors), whereas the average maximum accuracy is 86.19% in Case 2. Thus, compared with Case 1, the accuracy is improved in Case 2. However, it is note that this improvement is achieved at the cost of employing a destructive procedure (i.e., artificial aging).

Exercise in Unsupervised Training of Models for LDOs Embedded in SoCs

An exercise was conducted using unsupervised training in accordance with various embodiments to develop ML models that can be used in detecting recycled components based on PSRR data from LDOs embedded in SoCs. For the exercise, no labels were provided to the model during training. The k-means algorithm was applied. In addition, the Silhouette method was applied when the k-means algorithm was used to validate the consistency within clusters so as to improve the accuracy of clustering. Furthermore, the replication (i.e., re-sampling) technique was applied to find lower, local minima of the Euclidean distances between examples. Moreover, once the k-means algorithm was run, the centroids the algorithm determined were further used to rerun the algorithm to deal with possible noisy samples. The results are exercise are now discussed.

During the exercise, two approaches were followed in training the model. For the first approach, only the PSRR of the component provided was measured and the measured PSRR values were given to the model in a pair-wise manner (i.e., golden and suspect). Accordingly, the suspect PSRR was determined as new or recycled by the model using a k-means algorithm. For the second approach, the initial PSRR of the unknown component was measured. Then, the component was artificially aged for either one or four hours and the PSRR was measured again. The measured PSRR values after aging, along with the initial values, were then provided to the model.

The results for k-means clustering is presented in FIG. 23. As can be seen, the results are divided into two cases. In this figure, Case 1 and Case 2 refer to the approaches described above, respectfully. In Case 1 2310, only the initial PSRR measured from the golden sample, and the suspect sample were provided to the model. However, in Case 2, artificial aging was performed on both these samples. One hour and four hours of artificial aging were selected due to the sufficient separation observed between the initial PSRR values and the ones collected after one hour and four hours of aging as shown in FIGS. 10A and 10B. For Case 2, the aged PSRR data of both the golden and suspect samples, along with the data provided in Case 1, were provided to the model to attempt to improve the learning accuracy further. In this case, the one-hour aged data 2315 and the four-hour aged data 2320 were offered separately to the model. The accuracy for each of the above instances is shown for components of various ages, as depicted in FIG. 23. In this figure, the x-axis shows the minimum age of the SoCs under test. Here if the age equals zero, it refers to the initial data from the sample. Accordingly, FIG. 23 shows the accuracy of clustering the unseen samples as either new or aged. The maximum accuracy for Case 1 is approximately 74%, while that for Case 2 is approximately 73%.

The results obtained from the unsupervised classification exercise provide an accuracy better than random, but the average accuracy is lower when compared to the supervised classification. The major reason for the lower accuracy may be due to the fact that the amount of noise and process variation is overpowering the PSRR degradation in this case. Since no labels were provided, it may have been difficult for the classifier to distinguish the new and recycled SoCs with only a single PSRR (aged/new) as a reference. The high variability across samples which is projected by the standard deviation (3σ) in FIGS. 10A and 10B can serve as a deterent for unsupervised clustering in these data sets in some cases. Similar challenges can also be seen in the unsupervised training exercise conduced for stand-alone LDOs, where detection accuracy is also a maximum of 74% for Case 1, although the detection accuracy improved to a maximum of 86% with Case 2. In other words, for the exercise, providing the aged PSRR of the suspect stand-alone LDOs during testing helped the model to obtain better accuracy. However, this was not the case for recycled SoC detection. This can be understood by the spikes and irregularities that are seen in the dataset, which may indicate that providing the aged version of the PSRR while testing can sometimes worsen the detection accuracy. In FIGS. 7A-7H, the noise/process variation profile for stand-alone LDOs was similar across both the new and aged PSRR distribution. There are no irregularities obtained in the distribution with aging that is not initially present in the new chip data set. Thus, when both the new and aged PSRR is provided during testing in particular instances, the process variation and noise can be nullified to a large extent, which can help the model to cluster correctly. However, for an SoC that is continuously active during the aging time, the clock, switching, and other activities may cause differences in the noise profile of the new and aged PSRR. Thus, the aged distribution can have certain irregularities that are not initially present in the new SoC distribution. As a result, providing the aged PSRR of the suspect SoC, along with the initial PSRR during testing in Case 2, was not able to reduce the noise or help the algorithm to provide better accuracy.

Application of the Models According to Various Embodiments

Turning now to FIG. 24, additional details are provided regarding a process flow for detecting recycled components such as recycled ICs and/or SoCs according to various embodiments. Here, FIG. 24 is a flow diagram showing a detection module for performing such functionality according to various embodiments of the present disclosure. For example, the flow diagram shown in FIG. 24 may correspond to operations carried out by a processor element 310 in a computing entity 300, as it executes the detection module.

The process flow 2400 begins with the detection module selecting the PSRR dataset recorded for a component in Operation 2410. Here, for instance, an entity may want to identify whether any components in a group (inventory) of components are recycled. For example, the components may be a shipment of SoCs a manufacturer has recently received from a new vendor and the manufacturer wants to ensure the SoCs are new and not recycled. Accordingly, the manufacture may select one or more of the SoCs found in the shipment for analysis. Therefore, the manufacturer may collect PSRR data on the LDOs embedded in the SoCs as described herein.

The detection module then executes one or more embodiments of the ML models as described herein on the PSRR dataset for the selected component in Operation 2415. As a result, in particular embodiments, the ML model(s) provide one or more classifications (e.g., probabilities) identifying the component as either recycled or new. Accordingly, the detection module determines whether the component has been identified as recycled in Operation 2420. If not, then the detection module marks the component as new in Operation 2425. However, if the component has been determined to be recycled, then the detection module marks the component as recycled in Operation 2430.

At this point, the detection module determines whether there is another component to be analyzed in Operation 2435. If so, then the module returns to Operation 2410, selects the PSRR dataset recorded for the next component, and performs the operations just discussed for the next component. Once all the components have been analyzed, the process flow ends.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for detecting whether a suspect component comprising at least one of an integrated circuit (IC) or a system-on-chip (SoC) is recycled, the method comprising:
processing power supply rejection ratio (PSRR) data obtained from a low dropout regulator (LDO) used for the suspect component using a recycle detection machine learning model to generate a recycle prediction, wherein the recycle detection machine learning model is developed based at least in part on degradation of PSRRs of LDOs, wherein the recycle detection machine learning model is developed using training and testing PSRR data collected from at least one of a plurality of standalone LDOs and a plurality of LDOs embedded in SoCs, wherein one or more of the at least one of the plurality of standalone LDOs and the plurality of LDOs embedded in SoCs are artificially aged;
determining whether the suspect component is recycled based at least in part on the recycle prediction; and
providing an indication that the suspect component is recycled in response to determining the component is recycled.

2. The computer-implemented method of claim 1, wherein the training and testing PSRR data comprises training PSRR data collected from at least one labeled LDO used by a first component of a first vendor that is used to train the recycle detection machine learning model and testing PSRR data collected from at least one labeled LDO used by a second component of the first vendor that is used to test the recycle detection machine learning model.

3. The computer-implemented method of claim 1, wherein the training and testing PSRR data comprises PSRR data collected from one or more labeled LDOs used by one or more components of a same category as the suspect component.

4. The computer-implemented method of claim 1, wherein the training and testing PSRR data comprises training PSRR data collected from at least one labeled LDO used by a first component of a first vendor that is used to train the recycle detection machine learning model and testing PSRR data collected from at least one labeled LDO used by a second component of a second vendor that is used to test the recycle detection machine learning model.

5. The computer-implemented method of claim 1, wherein the training and testing PSRR data comprises one or more labeled LDOs used by one or more components of a different category as the suspect component.

6. The computer-implemented method of claim 1, wherein the training and testing PSRR data comprises PSRR data collected from a non-labeled LDO used by a component.

7. An apparatus for detecting whether a suspect component comprising at least one of an integrated circuit (IC) or a system-on-chip (SoC) is recycled, the apparatus comprising at least one processor and at least one memory including program code, the at least one memory and the program code configured to, with the processor, cause the apparatus to at least:
process power supply rejection ratio (PSRR) data obtained from a low drop-out regulator (LDO) used for the suspect component using a recycle detection machine learning model to generate a recycle prediction, wherein the recycle detection machine learning model is developed based at least in part on degradation of PSRRs of LDOs, wherein the recycle detection machine learning model is developed using training and testing PSRR data collected from at least one of a plurality of standalone LDOs and a plurality of LDOs embedded in SoCs, wherein one or more of the at least one of the plurality of standalone LDOs and the plurality of LDOs embedded in SoCs are artificially aged;
determine whether the suspect component is recycled based at least in part on the recycle prediction; and
provide an indication that the suspect component is recycled in response to determining the component is recycled.

8. The apparatus of claim 7, wherein the training and testing PSRR data comprises training PSRR data collected from at least one labeled LDO used by a first component of a first vendor that is used to train the recycle detection machine learning model and testing PSRR data collected from at least one labeled LDO used by a second component of the first vendor that is used to test the recycle detection machine learning model.

9. The apparatus of claim 7, wherein the training and testing PSRR data comprises PSRR data collected from one or more labeled LDOs used by one or more components of a same category as the suspect component.

10. The apparatus of claim 7, wherein the training and testing PSRR data comprises training PSRR data collected from at least one labeled LDO used by a first component of a first vendor that is used to train the recycle detection machine learning model and testing PSRR data collected from at least one labeled LDO used by a second component of a second vendor that is used to test the recycle detection machine learning model.

11. The apparatus of claim 7, wherein the training and testing PSRR data comprises one or more labeled LDOs used by one or more components of a different category as the suspect component.

12. The apparatus of claim 7, wherein the training and testing PSRR data comprises PSRR data collected from a non-labeled LDO used by a component.

13. A computer program product for detecting whether a suspect component comprising at least one of an integrated circuit (IC) or a system-on-chip (SoC) is recycled, the computer program product comprising at least one non-transitory computer-readable storage medium having computer-readable program code portions stored therein, the computer-readable program code portions configured to:
process power supply rejection ratio (PSRR) data obtained from a low drop-out regulator (LDO) used for the suspect component using a recycle detection machine learning model to generate a recycle prediction, wherein the recycle detection machine learning model is developed based at least in part on degradation of PSRRs of LDOs, wherein the recycle detection machine learning model is developed using training and testing PSRR data collected from at least one of a plurality of standalone LDOs and a plurality of LDOs embedded in SoCs, wherein one or more of the at least one of the plurality of standalone LDOs and the plurality of LDOs embedded in SoCs are artificially aged;
determine whether the suspect component is recycled based at least in part on the recycle prediction; and
provide an indication that the suspect component is recycled in response to determining the component is recycled.

14. The computer program product of claim 13, wherein the training and testing PSRR data comprises training PSRR data collected from at least one labeled LDO used by a first component of a first vendor that is used to train the recycle detection machine learning model and testing PSRR data collected from at least one labeled LDO used by a second component of the first vendor that is used to test the recycle detection machine learning model.

15. The computer program product of claim 13, wherein the training and testing PSRR data comprises PSRR data collected from one or more labeled LDOs used by one or more components of a same category as the suspect component.

16. The computer program product of claim 13, wherein the training and testing PSRR data comprises training PSRR data collected from at least one labeled LDO used by a first component of a first vendor that is used to train the recycle detection machine learning model and testing PSRR data collected from at least one labeled LDO used by a second component of a second vendor that is used to test the recycle detection machine learning model.

17. The computer program product of claim 13, wherein the training and testing PSRR data comprises one or more labeled LDOs used by one or more components of a different category as the suspect component.

18. The computer program product of claim 13, wherein the training and testing PSRR data comprises PSRR data collected from a non-labeled LDO used by a component.

* * * * *